US006741031B2

(12) United States Patent
Harada et al.

(10) Patent No.: US 6,741,031 B2
(45) Date of Patent: May 25, 2004

(54) DISPLAY DEVICE

(75) Inventors: Shigeki Harada, Tokyo (JP); Takayoshi Nagai, Tokyo (JP); Kou Sano, Tokyo (JP); Shinsuke Yura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/166,060

(22) Filed: Jun. 11, 2002

(65) Prior Publication Data

US 2003/0132709 A1 Jul. 17, 2003

(30) Foreign Application Priority Data

Jan. 16, 2002 (JP) .................................... P2002-007360

(51) Int. Cl.[7] ........................ H01J 17/49; G02F 1/1335; G03B 21/00

(52) U.S. Cl. ............................................ 313/582; 349/5

(58) Field of Search ............................. 313/582; 349/5, 349/8, 95; 345/613, 589; 348/51

(56) References Cited

U.S. PATENT DOCUMENTS 5,801,794 A * 9/1998 Lehureau et al. .............. 349/5
6,064,424 A * 5/2000 van Berkel et al. ........... 348/51
6,072,272 A 6/2000 Rumbaugh

FOREIGN PATENT DOCUMENTS

| | | |
|---|---|---|
| JP | 2000-298451 | 10/2000 |
| JP | 2000-357463 | 12/2000 |
| JP | 2001-135242 | 5/2001 |

* cited by examiner

*Primary Examiner*—James Clinger
*Assistant Examiner*—Chuc Tran
(74) *Attorney, Agent, or Firm*—Birch, Stewart, Kolasch & Birch, LLP

(57) ABSTRACT

Components of an arrangement interval in first and second directions (v, h) between first to third subpixels (C1, C2, C3) in a pixel (PX) satisfy the following expressions: pv1=pv2=pv/2; pv3=0; and ph1=ph2<ph/3. Components of the arrangement interval in the first and second directions (v, h) between two pixels (PX) adjacent to each other in the second direction (h) satisfy the following expressions: pv4=pv/2 (=p/2); pv5=0; and ph4>ph/3. Pixels (PX) adjacent to each other in the first direction (v) have the same arrangement of the first to third subpixels (C1, C2, C3).

14 Claims, 19 Drawing Sheets

F I G . 2

| EVALUATION RESULTS OF "COLOR SPLIT" | | | |
|---|---|---|---|
| RATER | DELTA-ARRANGEMENT PIXEL PX ACCORDING TO FIRST PREFERRED EMBODIMENT | CONVENTIONAL DELTA-ARRANGEMENT PIXEL PD | CONVENTIONAL TRIO-ARRANGEMENT PIXEL PT |
| a | 2 | 0 | 2 |
| b | 1 | 0 | 2 |
| c | 1 | 0 | 2 |
| d | 2 | 0 | 2 |
| e | 2 | 0 | 2 |
| f | 1 | 0 | 2 |
| g | 2 | 0 | 2 |
| TOTAL | 11 | 0 | 14 |

F I G . 3

| EVALUATION RESULTS OF "GRAININESS" | | | |
|---|---|---|---|
| RATER | DELTA-ARRANGEMENT PIXEL PX ACCORDING TO FIRST PREFERRED EMBODIMENT | CONVENTIONAL DELTA-ARRANGEMENT PIXEL PD | CONVENTIONAL TRIO-ARRANGEMENT PIXEL PT |
| a | 1 | 0 | 1 |
| b | 1 | 0 | 2 |
| c | 1 | 0 | 1 |
| d | 0 | 0 | 0 |
| e | 1 | 0 | 1 |
| f | 1 | 0 | 2 |
| g | 2 | 0 | 2 |
| TOTAL | 7 | 0 | 9 |

DISPLAY DEVICE

BACKGROUND OF THE INVENTION

1. Field of the Invention

The present invention relates to a display device such as a plasma display panel (hereinafter also referred to as PDP), and more particularly to a display device in which color split (or color separation) is difficult to occur and which presents less graininess in images.

2. Description of the Background Art

Trio- (or stripe-) arrangement pixels and delta-arrangement pixels exemplify matrix type displays having pixels arranged in a matrix form. FIGS. 19 and 20 are schematic plan views showing a conventional trio-arrangement pixel PT and a conventional delta-arrangement pixel PD, respectively. Although each including three subpixels (or cells) C for emitting the three primary colors of light, red (R), green (G) and blue (B), respectively, these pixels differ from each other in arrangement of the subpixels C. A subpixel for emitting red, for example, is hereinafter also referred to as "red subpixel".

For ease of comparison, both of the trio-arrangement pixels PT and the delta-arrangement pixels PD respectively adjacent to each other in first and second (in this case, vertical and horizontal) directions v and h are spaced at an equal arrangement interval (hereinafter also briefly referred to as "interval") (the arrangement interval is indicated by p) or at an equal interval between pixel centers, respectively. The arrangement interval may be different in the first and second directions v and h. The subpixels C included in both of the pixels PD and PT have the same shape and area, each of which is rectangular with dimensions of (p/2) and (p/3) in the first and second directions v and h, respectively.

As shown in FIG. 19, in a display device 100T having the trio-arrangement pixels PT, red, green and blue subpixels C are arranged in this order in the second direction h, and subpixels C for the same luminous color are arranged in the first direction v. Particularly, components of the interval between adjacent subpixels C in the display device 100T are p and (p/3) in the first and second directions v and h, respectively. In this case, subpixels C in each pixel PT are aligned in a row in the second direction h, and pixels PT adjacent to each other either in the first or second direction v or h have the same subpixel arrangement.

On the other hand, as shown in FIG. 20, the red, green and blue subpixels C are arranged in the form of a delta (Δ) in each pixel PD. In the whole display of a display device 100D having delta-arrangement pixels PD, the red, blue and green subpixels C are arranged in this order in the second direction h, and subpixels C for the same luminous color are arranged in the first direction v. Particularly, components of the interval between adjacent subpixels C in the display device 100D are (p/2) and (p/3) in the first and second directions v and h, respectively.

In each delta-arrangement pixel PD, a subpixel C (for green, in this case) present singly in the second direction h is called "single subpixel" and two subpixels C (for red and blue, in this case) aligned adjacently in the second direction h are called "paired subpixels". It is possible to consider that the single subpixel C and the paired subpixels C are arranged alternately at an interval of (p/2) in the first direction v.

In the whole display of the display device 100D, pixels PD having the same subpixel arrangement are arranged adjacently in the first direction v. In the second direction h, two types of pixels PD are aligned alternately in which the single subpixel C and the paired subpixels C are arranged in reversed positions to each other in the first direction v.

In general, trio-arrangement pixels PT have good linearity both in the first and second directions v and h in spite of low resolution for the number of pixels, which are thus suitable for figure drawing. On the other hand, delta-arrangement pixels PD, whose adjacent subpixels C are spaced at an interval of (p/2) in the first direction v, generally have high resolution for the number of pixels, whereas being inferior to the pixels PT in linearity both in the first and second directions v and h. Since the pixels PT and PD both have advantages and disadvantages in display quality as described above, either of them is selected generally depending on images to be displayed or personal preference.

Japanese Patent Application Laid-Open No. 2000-357463, for example, discloses a basic configuration as an example of application of delta-arrangement pixels PD to a plasma display panel (PDP).

Further, as one application of such configuration, Japanese Patent Application Laid-Open No. 2000-298451 discloses a method of driving two data electrodes (W electrode) in common (hereinafter also referred to as "W electrode common address driving method"). With this method, circuit costs can be reduced.

As another application, Japanese Patent Application Laid-Open No. 2001-135242 discloses a method of distributing sustain discharge current paths (hereinafter also referred to as "current distributing method"). With this method, a peak current value in discharge current can be reduced, resulting in reduced circuit costs.

As described above, applications of delta-arrangement pixels PD to a PDP create the above-described various advantages which are not attainable by trio-arrangement pixels PT.

However, conventional delta-arrangement pixels PD have a problem of visibility in that "color split (or color separation)" easily occurs as compared to conventional trio-arrangement pixels PT.

The narrowest visual angle that a man of visual acuity of 1.0 can resolve is one minute angle. In a display device such as a PDP or CRT, one pixel is divided into three subpixels in area, to which the three primary colors, red, green and blue are assigned, respectively. These three subpixels are simultaneously illuminated, to thereby display white. However, when a visual angle between subpixels exceeds one minute angle, an observer sees the three colors splittingly (or separately) and becomes incapable of recognizing one pixel as white. Such phenomenon that the colors are seen splittingly (or separately) is called "color split (or color separation)". This color split depends on an observation distance and may become more significant as a display (therefore, a pixel) is observed from a nearer position.

The visual angle between subpixels C is assumed to be equal to the arrangement interval between the subpixels C when viewed from the same distance. Regardless of whether in the same pixel or between adjacent pixels, a minimum value of the interval between the subpixels C for the respective luminous colors (or distance between pixel centers) greatly affects color split. As shown in FIG. 19, in each pixel PT, the minimum value of the interval between the subpixels C (or the minimum value of the distance between the pixel centers) is 0.33 p. On the other hand, as shown in FIG. 20, the above minimum value is 0.6 p in each pixel PD. Accordingly, the minimum value between the pixel centers of the subpixels C in the pixels PD is substantially twice that in the pixels PT. Thus, color split easily occurs in the pixels PD as compared to the pixels PT.

Further, the conventional delta-arrangement pixels PD have another problem of visibility of presenting "graininess" more than in the conventional trio-arrangement pixels PT. This phenomenon easily occurs when black layers are provided in non-display areas NC (see FIGS. 19 and 20) between the subpixels C.

SUMMARY OF THE INVENTION

An object of the present invention is to provide a display device in which color split is difficult to occur and which presents less graininess in images.

According to the present invention, the display device includes a plurality of pixels aligned in a first direction and a second direction perpendicular to the first direction and arranged as a whole in a matrix form in a plan view, the plurality of pixels each including first to third subpixels arranged in the form of a delta in the plan view.

In the display device, expressions: pv1=pv2=pv/2; pv3=0; and ph1=ph2<ph/3 hold where: components of an arrangement interval between the plurality of pixels in the first and second directions are indicated by pv and ph, respectively; with respect to each of the plurality of pixels, components of the arrangement interval between the first and second subpixels in the first and second directions are indicated by pv1 and ph1, respectively; components of the arrangement interval between the second and third subpixels in the first and second directions are indicated by pv2 and ph2, respectively; and a component of the arrangement interval between the first and third subpixels in the first direction is indicated by pv3.

Further, expressions: pv4=pv/2; pv5=0; and ph4>ph/3 hold where: with respect to first and second subpixels among the plurality of pixels adjacent to each other in the second direction, components of the arrangement interval between the third subpixel of the first pixel and the first subpixel of the second pixel in the first and second directions are indicated by pv4 and ph4, respectively; and a component of the arrangement interval between the second subpixel of the first pixel and the first subpixel of the second pixel in the first direction is indicated by pv5.

Further, adjacent ones of the plurality of pixels in the first direction have the same arrangement of the first to third subpixels.

In the display device, the minimum value of the arrangement interval between the first to third subpixels is smaller than that of the arrangement interval between three subpixels in conventional delta-arrangement pixels. Thus, color split is difficult to occur where the first to third subpixels display, for example, red, green and blue, respectively. Further, since the component of the arrangement interval between the second subpixel and the first and third subpixels in the first direction is equal to that in the conventional delta-arrangement pixels, the display device according to the present invention achieves high resolution for the number of pixels.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a table showing evaluation results of color split in the display device according to the first preferred embodiment;

FIG. 3 is a table showing evaluation results of graininess in the display device according to the first preferred embodiment;

DESCRIPTION OF THE PREFERRED EMBODIMENTS

<First Preferred Embodiment>

Figure 1:
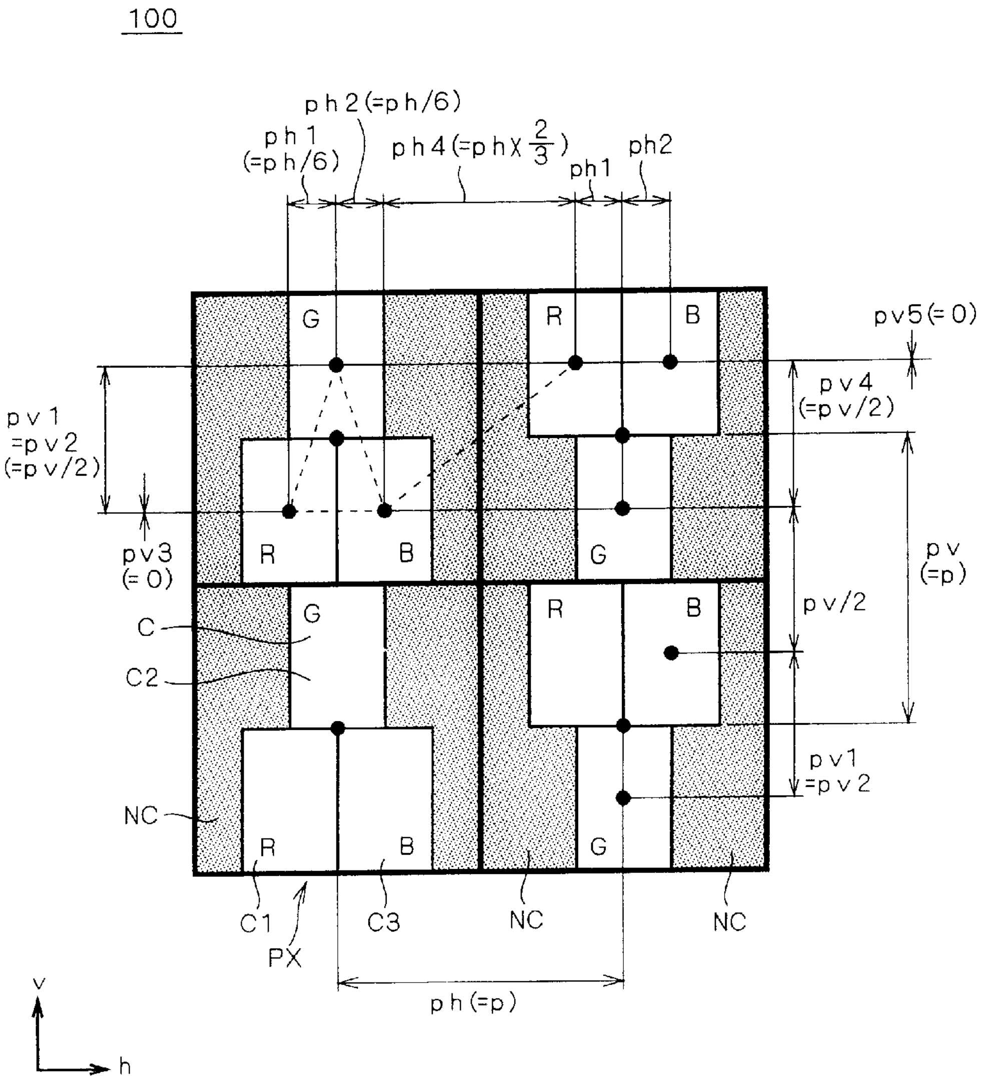
FIG. 1 is a schematic plan view showing a display device according to a first preferred embodiment of the present invention.

FIG. 1 is a schematic plan view showing a display device 100 according to a first preferred embodiment. A display of the display device 100 includes a plurality of pixels PX aligned in a first (here, vertical) direction v and a second (here, horizontal) direction h perpendicular to the first direction v and arranged as a whole in a matrix form in the plan view of the display. FIG. 1 shows four pixels PX arranged in a matrix of 2×2 as an example. An arrangement interval (hereinafter also briefly referred to as "interval") between adjacent pixels PX in the first direction v is set in pv, and an interval between adjacent pixels PX in the second direction h is set in ph.

The arrangement interval between adjacent pixels PX is given as an interval (distance) between pixel centers of the adjacent pixels PX. The center of a pixel PX is given as an intersection of lines passing through midpoints of respective dimensions in the first and second directions v and h. Conversely, the center of a subpixel C can be decomposed into components in the first and second directions v and h (i.e., the center in the first and second directions v and h). The same explanation applies to the center of a subpixel C which will be described later. In this case, the center of a pixel PX is also given as, for example, the center of a triangle formed by connecting the centers of the three subpixels C forming a pixel PX arranged in the form of a delta.

Although it is possible to set pv and ph as pv≠ph, the following equation:

$$pv=ph=p \quad (1)$$

shall hold in this case for ease of explanation and comparison with the conventional pixels PT and PD.

Each pixel PX is constituted by the three subpixels C arranged in the form of a delta in the plan view of the display. Hereinafter, the three subpixels C arranged in the form of a delta are distinguishably called "first to third subpixels C1, C2 and C3" as necessary. The second subpixel C2 corresponds to the single subpixel C present singly in the second direction h, and the first and third subpixels C1 and C3 correspond to the paired subpixels C aligned in the second direction h.

In the display device 100, the first to third subpixels C1 to C3 are formed in the same shape and area, which shall be equal to those of the subpixels C in the conventional pixels PT and PD for ease of explanation. In short, the subpixels C1 to C3 are set in the form of rectangular with dimensions of (p/2) and (p/3) in the first and second directions v and h, respectively.

The subpixels C1 to C3 are unit regions whose display/non-display of predetermined luminous colors can be controlled in the plan view of the display (or, in a PDP which will be described later, unit regions whose emission/non-emission can be controlled). In contrast, regions whose display/non-display cannot be controlled (or, in the PDP which will be described later, regions that do not emit) are called "non-display (or non-luminous) areas NC". In the display device 100, the first to third subpixels C1 to C3 are capable of displaying red (R), green (G) and blue (B), respectively, as an example.

In the display device 100, pixels PX adjacent in the first direction v have the same arrangement of the first to third subpixels C1 to C3, while those adjacent in the second direction h have the single subpixel C2 and the paired subpixels C1 and C3 arranged in reversed positions to each other in the first direction v (in other words, two pixels PX adjacent to each other in the second direction h are rotationally symmetrical about the center between the two pixels PX).

Particularly, in the display device 100, each of the plurality of pixels PX is set to satisfy the following expressions:

$$pv1=pv2=pv/2 \quad (2)$$

$$pv3=0 \quad (3)$$

$$ph1=ph2<ph/3 \quad (4)$$

where:

- components of the arrangement interval between the first and second subpixels C1 and C2 in the first and second directions v and h are indicated by pv1 and ph1, respectively;
- components of the arrangement interval between the second and third subpixels C2 and C3 in the first and second directions v and h are indicated by pv2 and ph2, respectively; and
- a component of the arrangement interval between the third and first subpixels C3 and C1 in the first direction v is indicated by pv3.

Further, two arbitrary pixels PX adjacent to each other in the second direction h (hereinafter distinguishably called "first and second pixels" ) are set to satisfy the following expressions:

$$pv4=pv/2(=p/2) \quad (5)$$

$$pv5=0 \quad (6)$$

$$ph4>ph/3 \quad (7)$$

where:

- components of the arrangement interval between the third subpixel C3 of the first pixel PX and the first subpixel C1 of the second pixel PX in the first and second directions v and h are indicated by pv4 and ph4, respectively; and
- a component of the arrangement interval between the second subpixel C2 of the first pixel PX and the first subpixel C1 of the second pixel PX in the first direction v is indicated by pv5.

More specifically, in relation to the expressions (4) and (7), the display device 100 is set to satisfy the following expressions:

$$ph1=ph2=ph/6(<ph/3) \quad (8)$$

$$ph4=ph\times 2/3(>ph/3) \quad (9)$$

As described above, in the display device 100D having the conventional delta-arrangement pixels PD (FIG. 20), the subpixels C are arranged in the whole display at an equal interval of (p/3) with respect to the component of the arrangement interval in the second direction h. In contrast, the subpixels C1 to C3 in the display device 100 are arranged at unequal intervals with respect to the component of the arrangement interval in the second direction h. Specifically, as is apparent from the expressions (1), (4) and (7), with respect to the component in the second direction h in an arbitrary pixel PX, the interval between the first and second subpixels C1 and C2 is equal to that between the second and third subpixels C2 and C3, whereas being smaller than that between the third subpixel C3 of the arbitrary pixel PX and the first subpixel C1 of a pixel PX adjacent to the arbitrary pixel PX in the second direction h.

According to the definition in the expressions (1), (8) and (9), the arrangement interval between the first and third subpixels C1 and C3 becomes the minimum. At this time, the following are true:

- the minimum value of the arrangement interval between the first and third subpixels C1 and C3 is 0.33 p;
- the minimum value of the arrangement interval between the first and second subpixels C1 and C2 is 0.53 p; and
- the minimum value of the arrangement interval between the second and third subpixels C2 and C3 is 0.53 p.

Since the minimum value of the arrangement interval between the subpixels C is 0.6 p in each conventional pixel PD as described above, the minimum value in the display device 100 is smaller. Therefore, color split is difficult to occur according to the pixels PX.

On the other hand, the component of the arrangement interval between the single subpixel C2 and the paired subpixels C1 and C3 in the first direction v is (p/2), which is equal to that in the conventional delta-arrangement pixels PD. This allows the display device 100 to achieve high resolution for the number of pixels.

Figure 20:
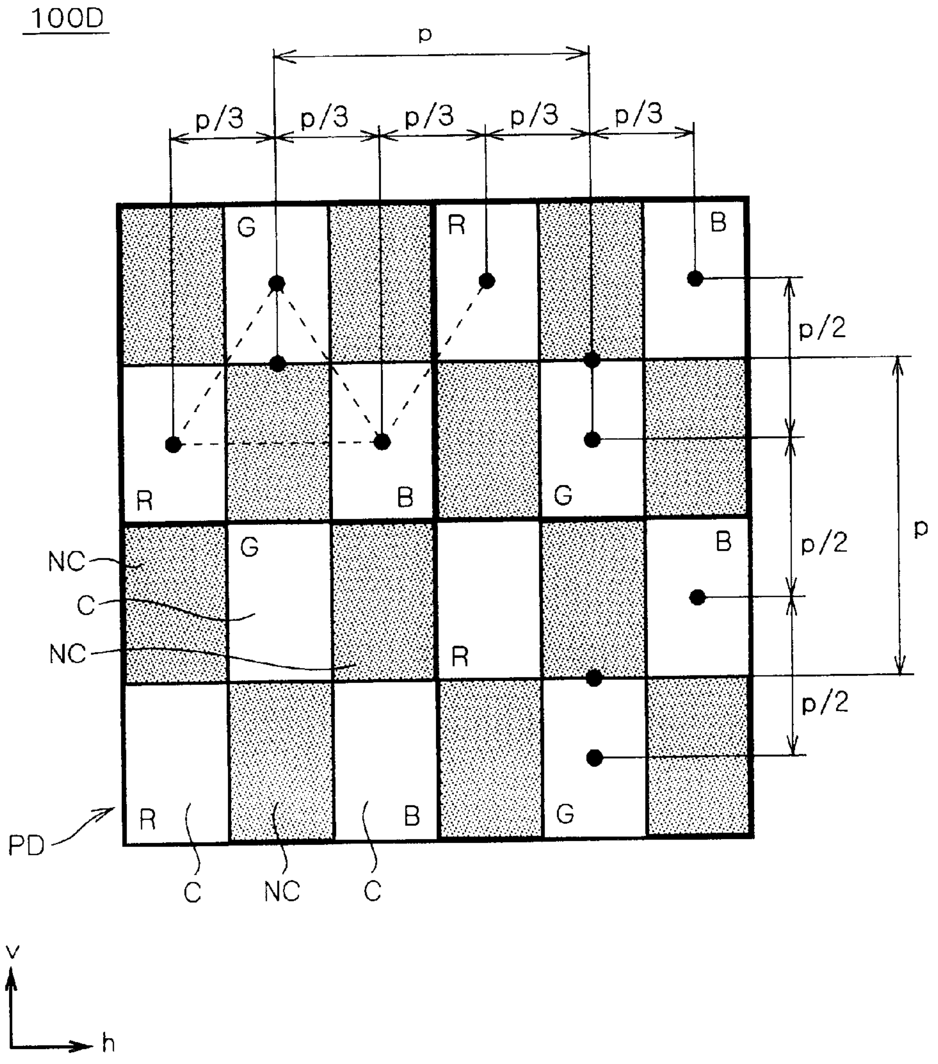
F I G . 2 0 (PRIOR ART)
FIG. 20 is a schematic plan view showing a conventional delta-arrangement pixel.

According to the expression (4), the component of the arrangement interval between the first and third subpixels C1 and C3 in the second direction h in each pixel PX is smaller than that of the arrangement interval between the paired subpixels C in each conventional pixel PD. Therefore, even if a non-display area NC is provided between the first and third subpixels C1 and C3 in each pixel PX of the display device 100, such non-display area NC is smaller than that present in the corresponding position in each pixel PD (FIG. 20). According to the aforementioned definition of the shape, area and arrangement of the subpixels, it is possible to prevent such non-display area NC from being formed between the first and third subpixels C1 and C3 in each pixel PX as shown in FIG. 1.

Therefore, when black layers are formed in the non-display areas NC of the display device 100, part of the black layers present between the first and third subpixels C1 and C3 in each pixel PX is smaller than that in the conventional display device 100D.

Further, according to the expression (7), it is possible to prevent the subpixels C1 to C3 of a pixel PX from being in contact with those of an adjacent pixel PX in the second direction h. This allows each non-display area NC to be formed with a pattern extending in the first direction v in the plan view.

Therefore, when the black layers are provided in the non-display areas NC of the display device 100, the black layers are in the form of belts or stripes (black stripes) extending in the first direction v in the plan view.

Since the non-display areas NC lie scattered in the form of dots due to the arrangement position of the subpixels C and the like in the conventional display device 100D, the black layers in the non-display areas NC are also provided in the form of dots (which are also called "black dots"). Each black dot is provided between the three subpixels C constituting one pixel PD, which is thus present singly. This appears to cause "graininess" to be readily seen.

On the other hand, since the black layers are formed in stripes in the display device 100, the display device 100 presents less graininess than the conventional display device 100D. This may be attributed to the same reason that the conventional display device 100T having the trio-arrangement pixels PT presents less graininess. In other words, the black layers are formed in stripes (which are also called "black stripes) between pixels PT aligned in the first direction v (i.e., between subpixels C) in accordance with the shape of the non-display areas NC.

Even when a non-display area NC is present between the first and third subpixels C1 and C3 in each pixel PX of the display device 100, a black layer to be provided in such non-display area NC is a dot smaller than that in the conventional display device 100D. Therefore, even in this case, it is possible to suppress graininess in the display device 100 as compared to the display device 100D.

FIG. 2 is a table showing subjective evaluation results of color split performed for the display device 100 (specifically, a PDP 101 which will be described later) together with evaluation results performed for the display device 100D having the conventional delta-arrangement pixels PD and the display device 100T having the conventional trio-arrangement pixels PT. The evaluations were conducted using the rating scale method, in which the display devices were each given any of marks of 2, 1 and 0 for three categories, "no color-split", "normal" and "color-split appears", respectively. Seven people skilled in images conducted the evaluations while moving in the distance range of 2H to 3H (H is the height of a display (i.e., the dimension in the vertical direction)) which is in the vicinity of one minute angle. FIG. 2 shows a dramatic improvement in suppressing color split in the pixels PX of the present embodiment as compared to the conventional pixels PD.

FIG. 3 is a table showing subjective evaluation results of graininess performed for the display device 100 (specifically, the PDP 101 which will be described later) together with evaluation results performed for the conventional display devices 100D and 100T. Such evaluations were conducted using the rating scale method, in which the display devices were each given any of marks of 2, 1 and 0 for three categories, "no graininess", "normal" and "graininess appears", respectively. Seven people skilled in images conducted the evaluations while moving in the distance range of 2H to 3H (H is the height of the display (i.e., the dimension in the vertical direction)) which is in the vicinity of one minute angle. FIG. 3 shows a dramatic improvement in suppressing graininess in the pixels PX of the present embodiment as compared to the conventional pixels PD.

Although a display device in which the single subpixel is a green subpixel and the paired subpixels are red and blue subpixels is employed as the display devices 100 and 100D in the above evaluations, the delta-arrangement pixels PX of the present embodiment achieve improvement in suppressing color split and graininess with the red, green and blue subpixels arranged in any way.

Figure 4:
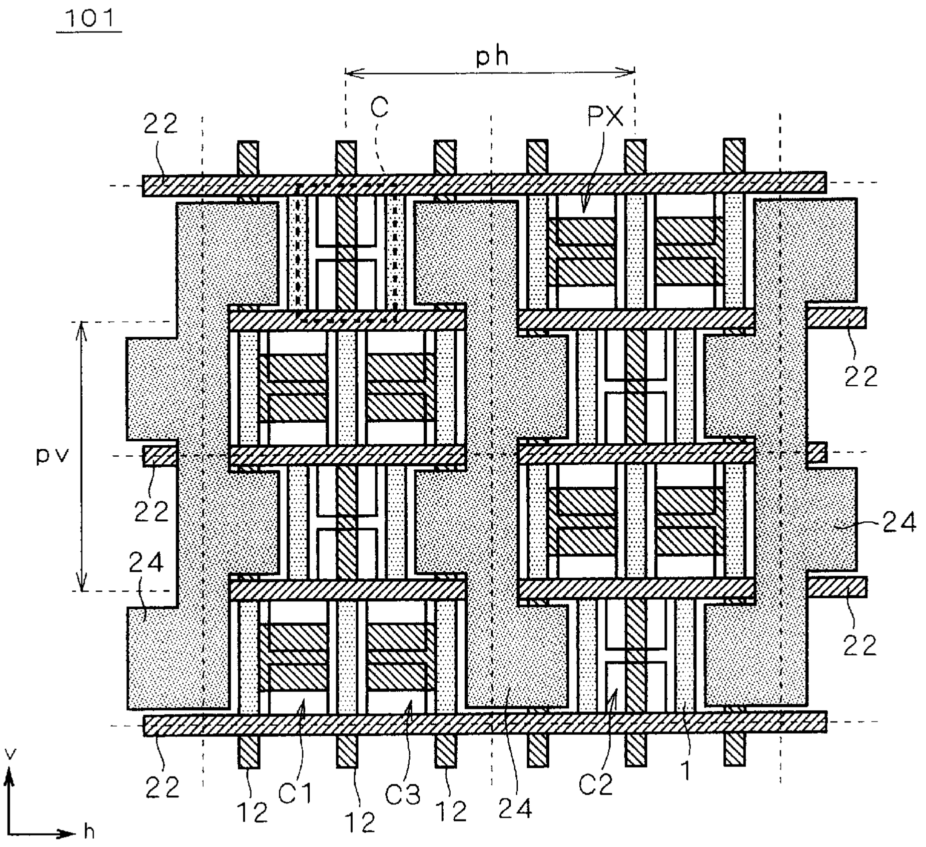
FIG. 4 is a schematic plan view showing a PDP according to the first preferred embodiment.
Figure 5:
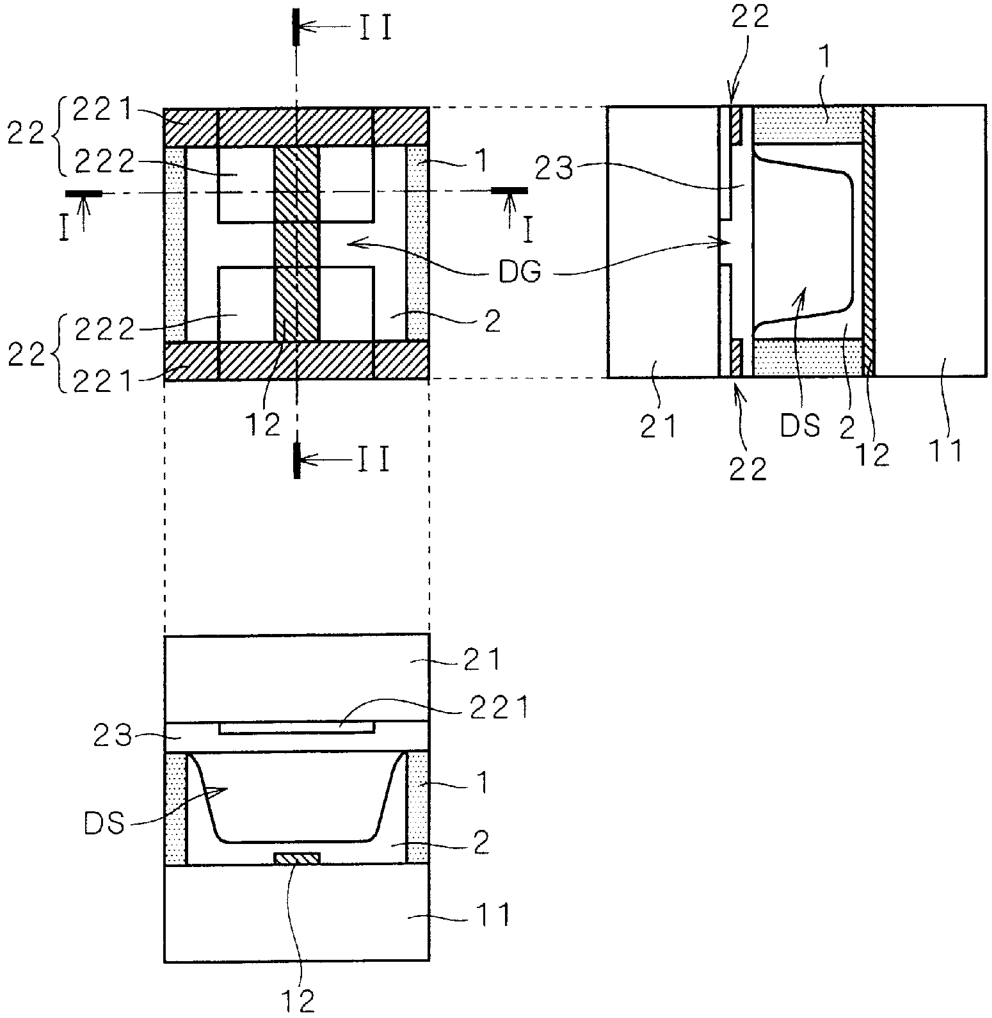
FIG. 5 show a schematic plan view and sectional views of the PDP according to the first preferred embodiment.
Figure 6:
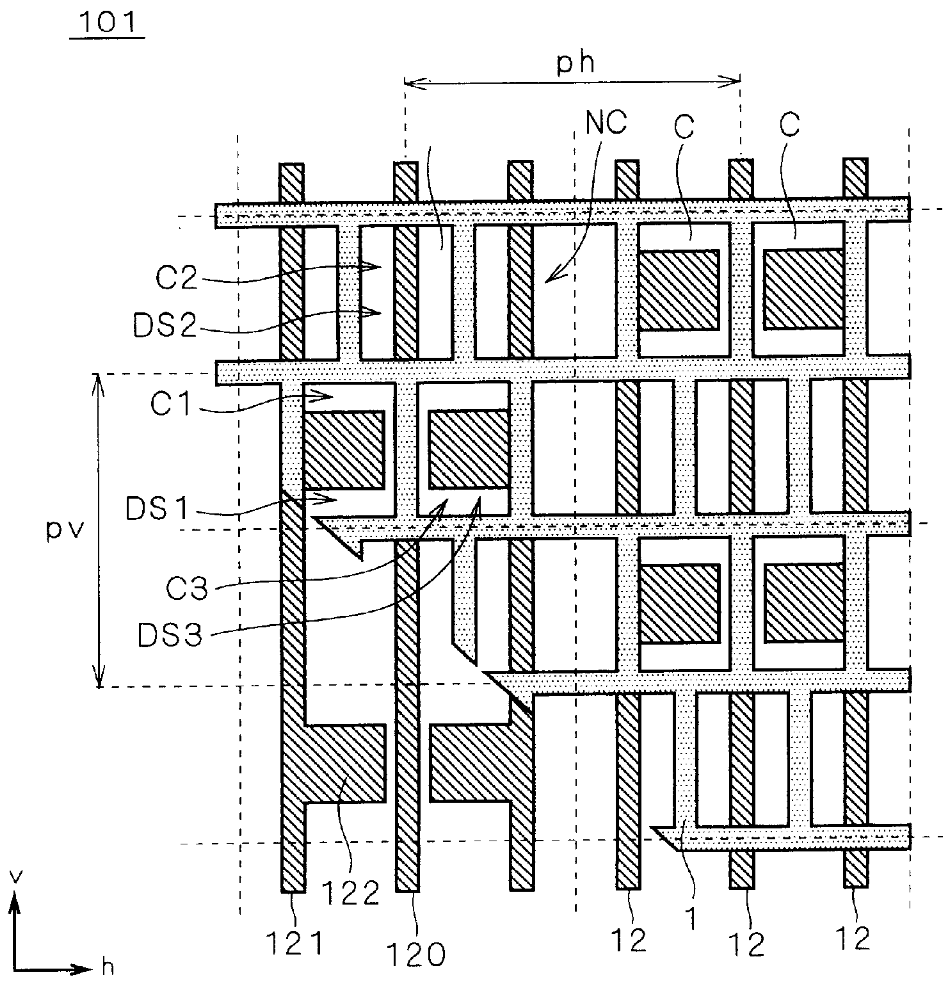
FIGS. 6 and 7 are schematic plan views showing the PDP according to the first preferred embodiment.
Figure 7:
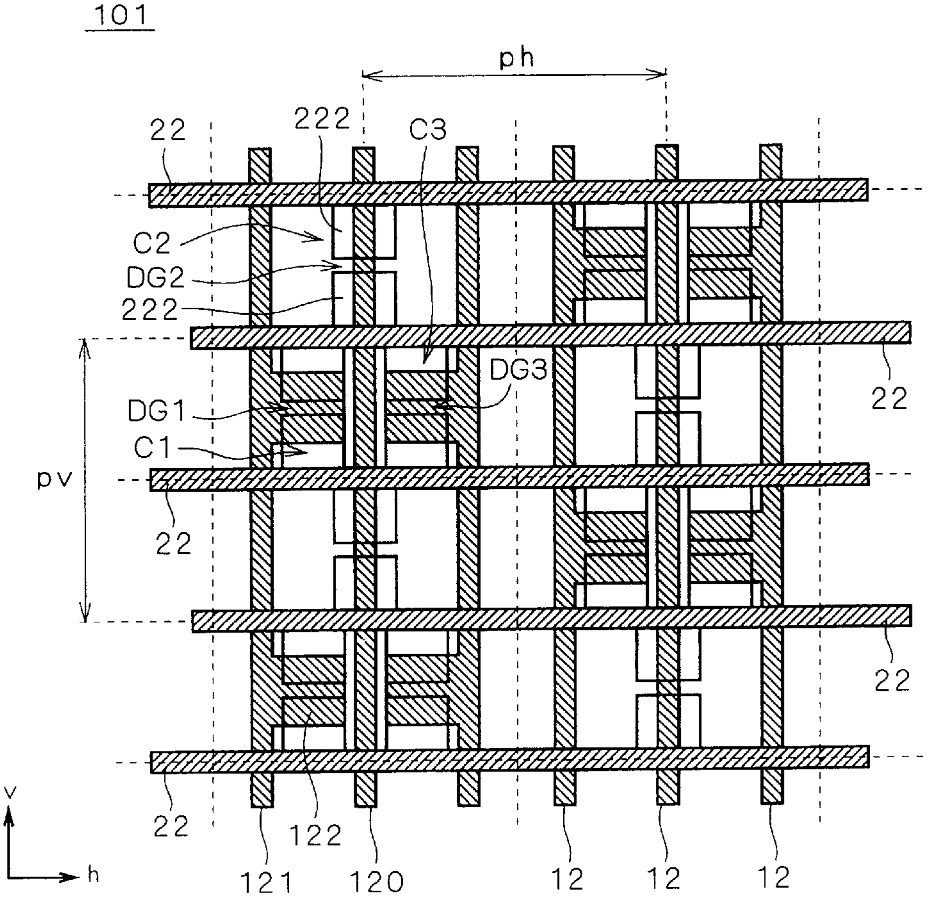

Next, a specific example in the case that the above-described display device 100 is a plasma display panel (PDP) will be described. FIG. 4 is a schematic plan (or layout) view showing the PDP 101 according to the present embodiment. FIG. 5 is a schematic plan view showing part of FIG. 4 enclosed by broken lines in rectangular (specifically, the part including the first subpixel C1) together with schematic sectional views taken along the lines I—I and II—II of the plan view. Further, for explanation, FIGS. 6 and 7 are schematic plan views showing part of components extracted from FIG. 4. Illustration of phosphor layers 2 and the like is omitted in FIG. 4, for example, for preventing complexity of illustration. Such omission will also be made in FIGS. 6 and 7 which will be described later.

The PDP (or display device) 101 is generally called "three-electrode surface discharge type AC-PDP", including first and second substrates 11 and 21, a plurality of first electrodes 12, a plurality of second electrodes 22, a dielectric layer 23, a rib (or barrier rib) 1, the phosphor layers 2 and a plurality of black layers 24. FIG. 6 is a cutaway view of part of the rib 1.

Specifically, the first and second substrates 11 and 21 are opposed to each other at a predetermined spacing, each being made of a glass substrate, for example. The plurality of first electrodes 12 are formed on a main surface of the first substrate 11 (on the side of the second substrate 21) and aligned in the second direction h. Particularly, the plurality of first electrodes 12 include a plurality of (stripe or belt) electrodes 120 extending in the first direction v, a plurality of branch electrodes 122 (to be described later) scattered around on the PDP 101 and a plurality of trunk electrodes 121 connecting adjacent ones of the branch electrodes 122 in the first direction v. The branch electrodes 122 are (solid) rectangular, for example, arranged on both sides of the stripe electrodes 120. The trunk electrodes 121 connect the branch electrodes 122 to one another on the far side of the stripe electrodes 120. Further description of the three types of electrodes 120, 121 and 122 will be made later.

On the other hand, the plurality of second electrodes 22 are formed on a main surface of the second substrate 21 (on the side of the first substrate 11) and aligned in the first direction v. The second electrodes 22 each include a metal auxiliary electrode (also referred to as "bus electrode") 221 and a plurality of transparent electrodes 222 connected to the metal auxiliary electrode 221, projecting in the first direction v.

The plurality of transparent electrodes 222 alternately project in different directions (e.g., up and down directions in FIG. 7) with respect to the metal auxiliary electrode 221. The transparent electrodes 222 of adjacent ones of the second electrodes 22 are opposed so as to form a discharge gap DG therebetween. Although FIG. 5 illustrates the case that the transparent electrodes 222 and the metal auxiliary electrode 221 are provided in this order on the second substrate 21, the electrodes 221 and 222 may be arranged in the reversed order or may be connected by their edges. The second and first electrodes 22 and 12 intersect grade-separately.

In the PDP 101, where the second substrate 21 serves as a display surface or screen, the second electrodes 22 include the transparent electrodes 222 in order to lead out visible light effectively. The second electrodes 22 further include the metal auxiliary electrodes 221 of low impedance in order to supply the transparent electrodes 222 with current from a circuit part. Further description of the transparent electrodes 222 will be made later.

The dielectric layer 23 is formed on the second substrate 21 to cover the second electrodes 22. Although detailed illustration is omitted, the dielectric layer 23 may include a cathode film made of MgO, for example, as a surface layer on the side of the first substrate 11, i.e., as a portion exposed to discharge spaces DS which will be described later.

Provided in a space between the first and second substrates 11 and 21 is the (single) rib 1 in contact with the first electrodes 12 and the dielectric layer 23. The rib 1 (FIG. 6) includes a plurality of portions formed on the metal auxiliary electrodes 221 extending in the second direction h in the plan view and a plurality of portions extending in the first direction v for connecting the plurality of portions extending in the second direction h to one another. The rib 1 is formed in meshes, each of which is rectangular in the plan view, for dividing the space between the first and second substrates 11 and 21 into a plurality of discharge spaces DS (in the form of rectangular in the plan view in this case). Each of the discharge spaces DS forms a discharge cell (i.e., the rib 1 surrounds the plurality of discharge spaces DS). Particularly, the plurality of discharge spaces DS each correspond to a subpixel C in the aforementioned display device 100 (FIG. 1) in the plan view. Discharge spaces DS corresponding to the first to third subpixels C1 to C3 are hereinafter referred to as "first to third discharge spaces DS1, DS2 and DS3".

The space between the first and second substrates 11 and 21 contains a plurality of spaces corresponding to the non-display areas (or non-luminous areas) NC (FIG. 1) other than the first to third discharge spaces DS1 to DS3. These spaces corresponding to the non-display areas NC correspond to spaces between adjacent pixels PX in the second direction h and extend in the first direction v. Particularly, the first to third discharge spaces DS1 to DS3 are adjacent to one another with the rib 1 interposed therebetween without (spaces corresponding to) non-display areas NC interposed between the first to third discharge spaces DS1 to DS3, i.e., between the first to third subpixels C1 to C3. In the PDP 101, the spaces corresponding to the non-display areas NC extending in the first direction v are divided into a plurality of spaces by the aforementioned plurality of portions of the rib 1 extending in the second direction h. The rib 1 serves to divide the discharge spaces DS1 to DS3 as well as to serve as a support for supporting the PDP 101 so as not to be broken by the atmospheric pressure.

The aforementioned plurality of branch electrodes 122 are opposed to the first and third discharge spaces DS1 and DS3. The stripe electrodes 120 are each provided to be opposed to (i.e., in the plan view, to be hidden by) the portions of the rib 1 extending in the first direction v for dividing the first and third discharge spaces DS1 and DS3. Accordingly, the first electrodes 12 are each opposed to any one of the first to third discharge spaces DS1 to DS3.

Further, the aforementioned transparent electrodes 222 (therefore, the second electrodes 22) are provided in such a manner that the discharge gaps DG are opposed to the first to third discharge spaces DS1 to DS3, respectively. The discharge gaps DG opposed to the first to third discharge spaces DS1 to DS3 are hereinafter referred to as "first to third discharge gaps DG1, DG2 and DG3", respectively. The second discharge gap DG2 is opposed to the stripe electrodes 120 of the first electrodes 12 with the second discharge space DS2 interposed therebetween, while the discharge gaps DG1 and DG3 are opposed to the branch electrodes 122 of the first electrodes 12 with the first and third discharge spaces DS1 and DS3 interposed therebetween.

Further, the phosphor layers 2 are provided in the discharge spaces DS. Specifically, the phosphor layers 2 are each formed on the first substrate 11 and on side faces of the rib 1 to cover the first electrodes 12 in discharge spaces DS. In the PDP 101, the phosphor layers 2 for emitting red (R), green (G) and blue (B) are provided in the first to third discharge spaces DS1 to DS3, respectively.

Provided on the main surface of the second substrate 21 are the black layers 24 formed in the non-display areas NC in the plan view. Although FIG. 4 shows the case that the black layers 24 are provided at a slight spacing from portions of the rib 1 forming the border between the non-display areas NC and the subpixels C1 to C3, the black layers 24 may be provided to be in contact with or to overlap the portions of the rib 1 forming the above-described border.

The space between the first and second substrates 11 and 21, more specifically, the discharge spaces DS and the space corresponding to the non-display areas NC, are filled with a discharge gas such as a gas mixture of Ne+Xe or that of He+Xe under a pressure not higher than the atmospheric pressure. The discharge gas is filled after air is exhausted from the space between the first and second substrates 11 and 21.

Next, a method of driving the PDP 101 will be described. The PDP 101 is operable similarly to a PDP corresponding to the display device 100D having the conventional pixels PD.

Specifically, emission/non-emission of discharge cells or subpixels C in the PDP 101 is controlled in a minimum time unit called "sub-field". The sub-field is further divided into three periods, i.e., "reset period", "writing period" and "sustain discharge period".

In the reset period, a discharge history in a previous sub-field is reset. Specifically, wall charges stored on the dielectric layer 23 opposite to the second electrodes 22 in the previous sub-field are reset.

In the writing period, wall charges are provided only for the discharge cell(s) in which sustain discharge needs to be created in a subsequent sustain discharge period. Specifically, the plurality of second electrodes 22 are alternately selected in sequence. This selection is performed by applying a negative pulse voltage to a target one of the plurality of second electrodes 22 to be selected. With the timing of applying the pulse voltage to the target of the second electrodes 22, a positive pulse voltage based on image data is applied to each of the first electrodes 12, thereby causing "writing discharge" between the first and second electrodes in the desired discharge cell(s). With this writing discharge, positive wall charges are stored on the dielectric layer 23 opposite to the second electrodes 22.

In the sustain discharge period, even numbered ones and odd numbered ones of the plurality of second electrodes 22 are alternately applied with a pulse-like voltage from outside. When a composite voltage of the voltage applied from outside and the voltage resulting from the wall charges stored in the previous writing period exceeds a firing voltage, discharge (sustain discharge) is caused. The phosphor layer 2 converts ultraviolet rays generated by the discharge into visible light, so that the discharge cell or subpixel C emits in a luminous color corresponding to the phosphor layer 2.

As described above, the stripe electrodes 120 of the first electrodes 12 are opposed to the second discharge spaces DS2 while being opposed to (i.e., hidden by) the portions of the rib 1 dividing the first and third discharge spaces DS1 and DS3. This allows an electric field of a sufficient intensity for causing discharge to be applied to the second discharge spaces DS2 while preventing such electric field from being applied to the first and third discharge spaces DS1 and DS3 (i.e., false discharge is suppressed). On the other hand, the branch electrodes 122 can be supplied with voltage through the trunk electrodes 121, and an electric field of a sufficient intensity for causing discharge can be applied to the first and third discharge spaces DS1 and DS3 through the branch electrodes 122.

As has been described, various driving methods applicable to the PDP having the conventional delta-arrangement pixels PD can be applied to the PDP 101 without modification. Therefore, the PDP 101 also enjoys the advantages that are obtainable by the aforementioned W electrode common address driving method, the current distributing method and the like.

Particularly, since the arrangement of the subpixels C in the above display device 100 is embodied in the PDP 101, color split is difficult to occur in the PDP 101, as a matter of course. Further, the PDP 101 presents less graininess because of the black layers 24 provided in the non-display areas NC.

Further, the black layers 24 can suppress reflection of outer light to improve the contrast ratio in a bright room. In the PDP 101, light emitted from the discharge cells are not shielded as the black layers 24 are provided in the non-display areas NC. In short, the contrast ratio can be improved without degrading the luminous efficiency.

<Second Preferred Embodiment>

Figure 8:
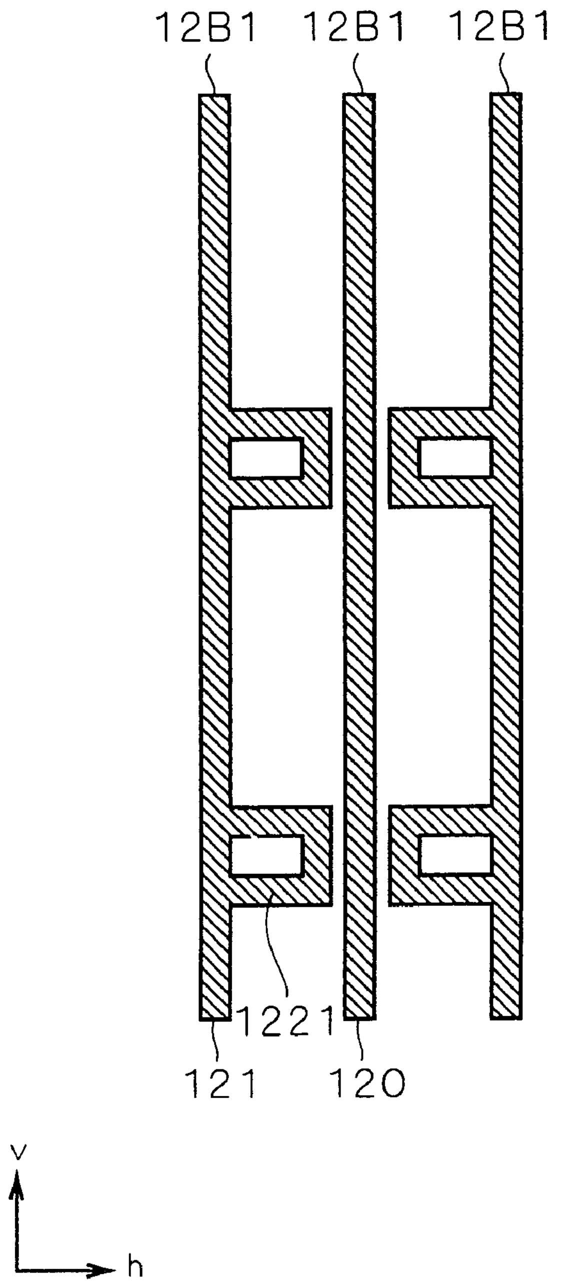
FIGS. 8 to 10 are schematic plan views showing first electrodes of a PDP according to a second preferred embodiment of the invention.
Figure 9:
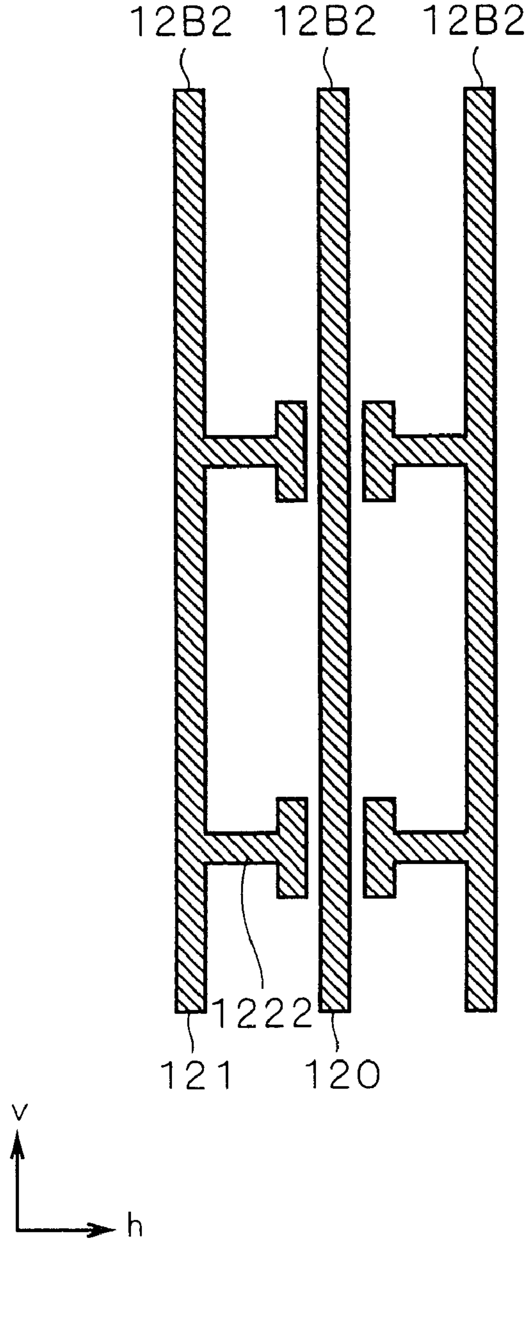
Figure 10:
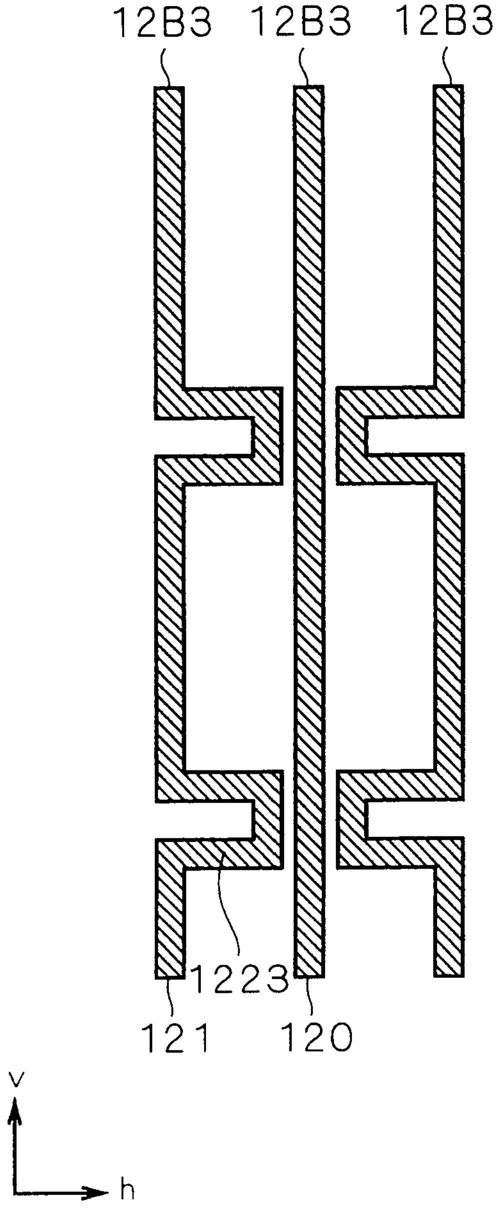

In place of the aforementioned first electrodes 12, first electrodes 12B1, 12B2 and 12B3 shown in schematic plan views of FIGS. 8 to 10 may be employed in the PDP 101. These first electrodes 12B1, 12B2 and 12B3 each have a structure in which the branch electrodes 122 are replaced by branch electrodes 1221, 1222 and 1223, respectively, in the first electrodes 12.

Specifically, the branch electrodes 1221 each have a hollow or O-shaped plane pattern formed by hollowing out the branch electrodes 122. The branch electrodes 1222 each have a T-shaped plane pattern with the head of T placed toward a corresponding one of the stripe electrodes 120 and an end of the leg of T connected to a corresponding one of the trunk electrodes 121. The branch electrode 1223 each have a U-shaped plane pattern with the bottom of U placed toward a corresponding one of the stripe electrodes 120 and an opening end of U connected to a corresponding one of the trunk electrodes 121.

The branch electrodes 1221, 1222 and 1223 are reduced in size as compared to the aforementioned (solid) rectangular branch electrodes 122, which allows the electrostatic capacity between the first electrodes to be reduced. This achieves reduced reactive power in the writing period.

At least two types of electrodes among the branch electrodes 122, 1221, 1222 and 1223 may be used in combination.

<Third Preferred Embodiment>

Figure 11:
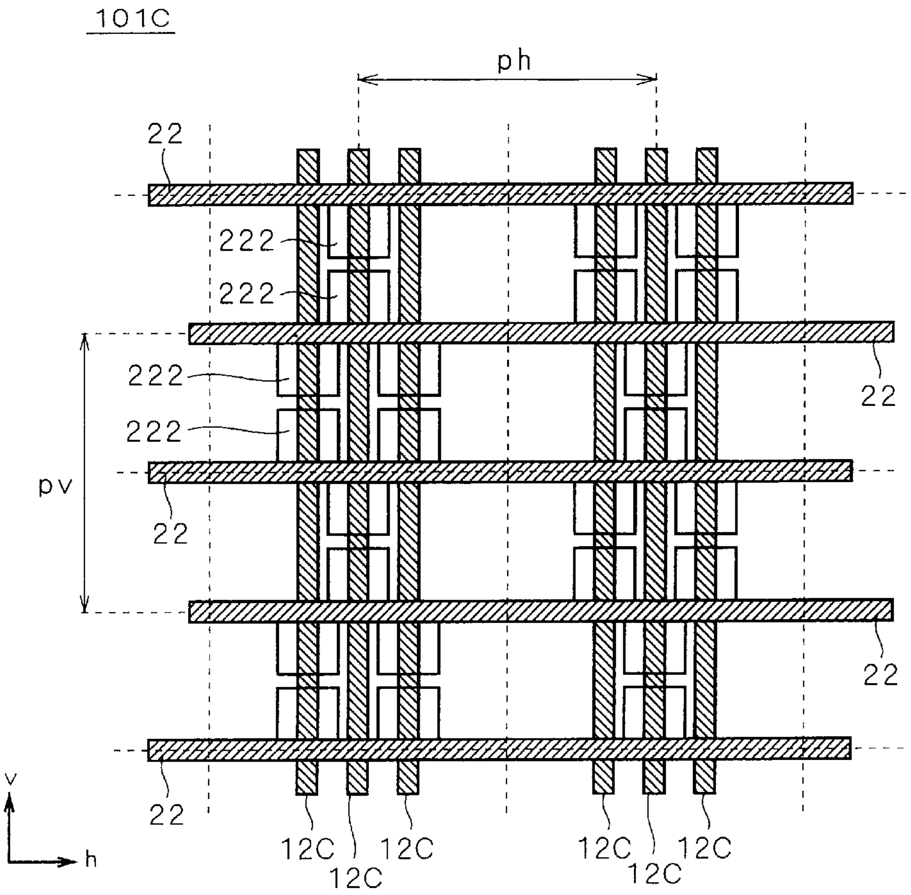
FIG. 11 is a schematic plan view showing a PDP according to a third preferred embodiment of the invention.

FIG. 11 is a schematic plan view showing part of components of a PDP (or display device) 101C according to a third preferred embodiment.

The PDP 101C includes first electrodes (or first and second stripe (or belt) electrodes) 12C in place of the first electrodes 12 in the aforementioned PDP 101 (FIG. 4), while other components are basically similar to those of the PDP 101.

The first electrodes 12C of the PDP 101C are each in the form of stripe or belt extending in the first direction v and opposed to any one of the discharge spaces DS1 to DS3 (FIG. 6) aligned in the first direction v. In this case, the first electrodes (or first stripe electrodes) 12C opposed to second discharge spaces DS2 aligned in the first direction v are opposed to (i.e., in the plan view, are hidden by) portions of the rib 1 dividing the first and third discharge spaces DS1 and DS3 similarly to the aforementioned stripe electrodes 120. Further, the first electrodes (or second stripe electrodes) 12C opposed to first discharge spaces DS1 aligned in the first direction v are opposed to (i.e., are hidden by) portions of the rib 1 defining the second discharge spaces DS2. Similarly, the first electrodes (or second stripe electrodes) 12C opposed to third discharge spaces DS3 aligned in the first direction v are opposed to (i.e., are hidden by) the portions of the rib 1 defining the second discharge spaces DS2. At this time, the first electrodes 12C are aligned in the second direction h with the same component of the arrangement interval between subpixels C in the second direction h.

Such shape and arrangement of the first electrodes 12C allow an electric field. of a sufficient intensity for causing discharge to be applied to discharge spaces DS to which the first electrodes 12C are opposed while preventing such electric field from being applied to discharge spaces DS to which the first electrodes 12C are not opposed (i.e., false discharge is suppressed).

In the aforementioned PDP 101, the branch electrode 122 each need to be aligned accurately with each discharge space DS. In contrast, the first electrodes 12C are opposed to the first to third discharge spaces DS1 to DS3, which eliminates the need of separately using the branch electrodes 122 and the like. Thus, there is no need to align branch electrodes in the first direction v, which enables simplification of manufacturing processes.

<Fourth Preferred Embodiment>

Figure 12:
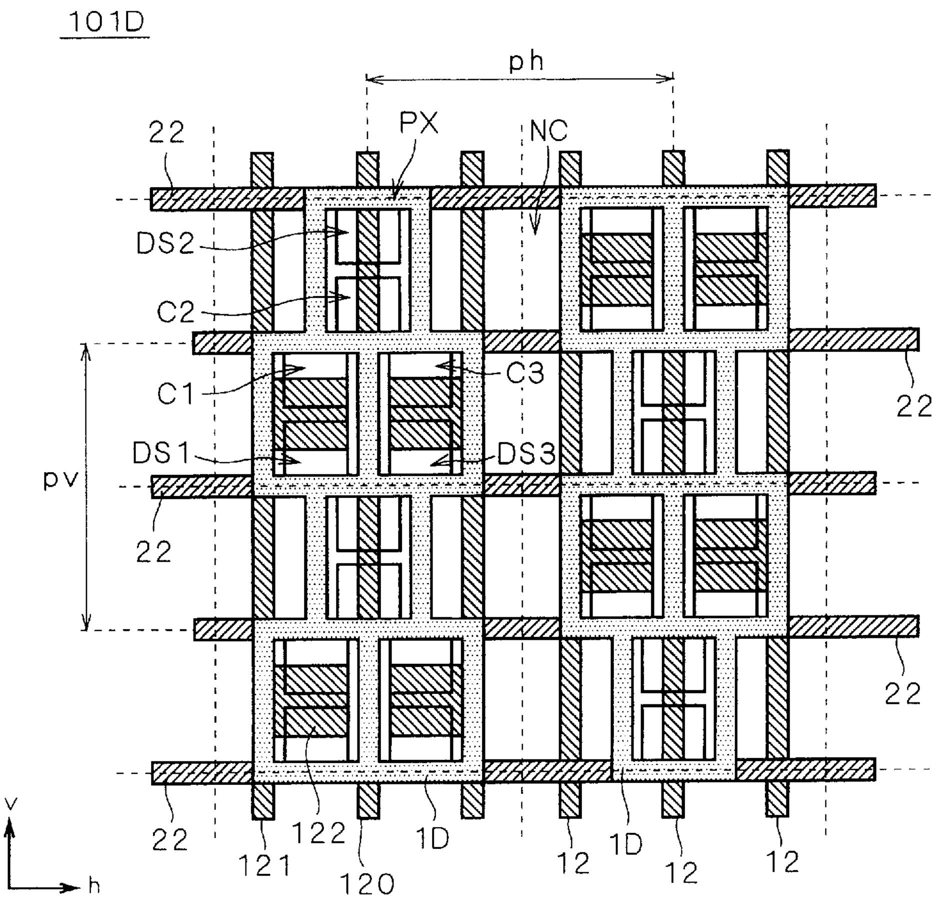
FIG. 12 is a schematic plan view showing a PDP according to a fourth preferred embodiment of the invention.

FIG. 12 is a schematic plan view showing part of components of a PDP (or display device) 101D according to a fourth preferred embodiment.

The PDP 101D includes a plurality of ribs 1D in place of the rib 1 in the aforementioned PDP 101 (FIG. 4), while other components are basically similar to those of the PDP 101. Although the ribs 1D appear to be present above the second electrodes 22 (on this side of the sheet of drawing) in FIG. 12 for ease of explanation, components of the PDP 101D are similar to those of the PDP 101 (FIG. 5) in arrangement position (arrangement order). Such illustration will also be made in FIGS. 13 to 18 which will be described later.

The plurality of ribs 1D of the PDP 101D each have a structure in which the portions of the rib 1 dividing the non-display areas NC extending in the second direction h are removed from the rib 1. In other words, the plurality of ribs 1D divide the plurality of first to third discharge spaces DS1 to DS3 similarly to the rib 1, whereas not being connected to one another in the second direction h.

Accordingly, the spaces corresponding to the non-display areas NC extend entirely in the first direction v. Therefore, the plurality of ribs 1D achieves higher exhaust conductance in the exhausting step to be performed before filling the discharge gas than the mesh-like rib 1 spread around entirely. Since the plurality of first to third discharge spaces DS1 to DS3 are also divided by the plurality of ribs 1D, creation of discharge in the first to third discharge spaces DS1 to DS3 is not affected even when the plurality of ribs 1D are not connected to one another.

The plurality of ribs 1D may be applied to the aforementioned PDP 101C or may be changed in shape in the plan view like a plurality of ribs 1E which will be described later.

<Fifth Preferred Embodiment>

In the above-described PDP 101 and the like, the first electrodes 12 are opposed to the rib 1 so as to suppress false discharge in subpixels C other than desired ones. However, when the rib 1 overlaps the first electrodes 12 to a great extent, capacitive coupling may increase, causing reactive power to be increased. Thus, a PDP capable of reducing such reactive power will be described in this fifth preferred embodiment.

Figure 13:
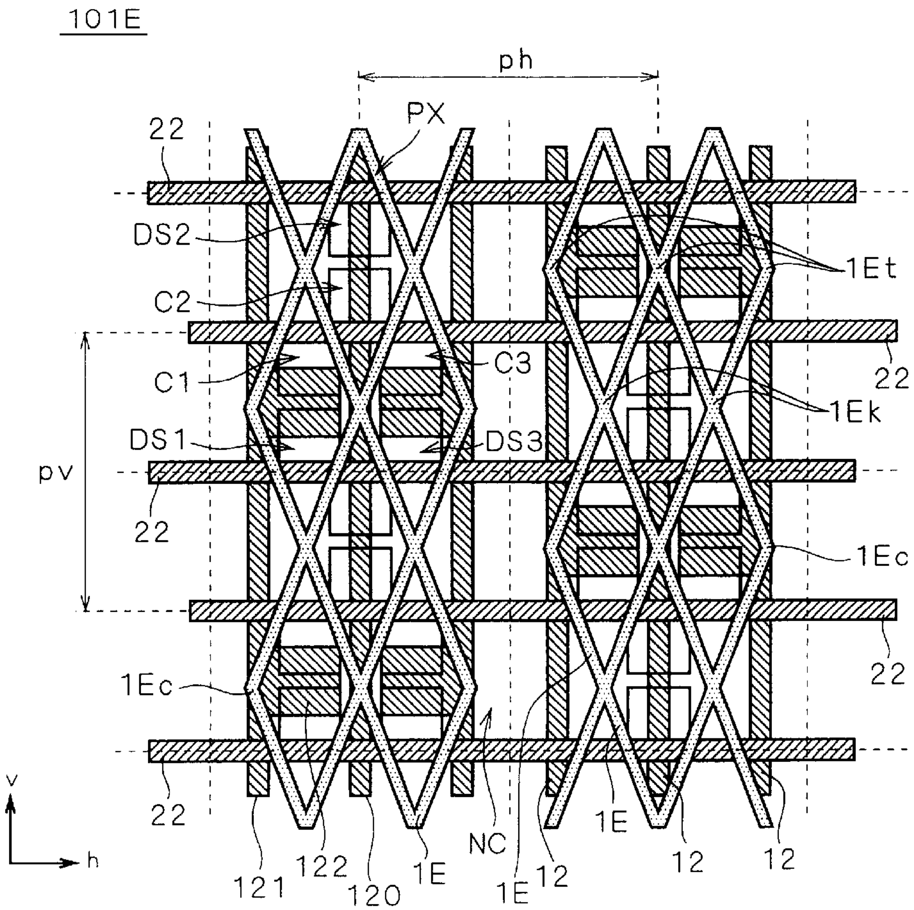
FIG. 13 is a schematic plan view showing a PDP according to a fifth preferred embodiment of the invention.

FIG. 13 is a schematic plan view showing part of components of a PDP (or display device) 101E according to the fifth preferred embodiment.

The PDP 101E includes the plurality of ribs 1E in place of the plurality of ribs 1D in the aforementioned PDP 101D (FIG. 12), while other components are basically similar to those of the PDPs 101 and 101D.

The ribs 1E each have a diamond-like mesh structure in the plan view, for dividing the plurality of first to third discharge spaces DS1 to DS3. The ribs 1E are each formed in such a manner that the discharge spaces DS, i.e., subpixels C have the same size in the plan view with a diamond shape longer in the first direction v. The first to third discharge spaces DS1 to DS3 are adjacent to one another with the ribs 1E interposed therebetween in each pixel PX without (the spaces corresponding to) non-display areas NC interposed between the first to third discharge spaces DS1 to DS3, i.e., the first to third subpixels C1 to C3.

Further, the ribs 1E are provided such that portions corresponding to tops 1Et of the diamond shape are opposed to the plurality of first electrodes 12 in the plan view. More specifically, the ribs 1E are each provided such that three tops 1Et of two diamond-like meshes dividing the first and third discharge spaces DS1 and DS3 aligned in the second direction h are opposed to the first electrodes 12, respectively.

In this case, two of the three tops 1Et on the both sides aligned in the second direction h form corner portions (projecting corner portions in the plan view) 1Ec of the peripheries of the ribs 1E. The corner portions 1Ec of the ribs 1E are each set to form an angle greater than 90° in the plan view.

As described above, the plurality of ribs 1E are opposed to the first electrodes 12 at the corner portions 1Et of the diamond-like meshes. This allows capacitive coupling to be reduced as compared to the aforementioned ribs 1D, resulting in a reduction in reactive power.

Further, with the ribs 1E, it is possible to increase an alignment margin in the second direction h. For instance, when an alignment displacement occurs in the second direction h between the rib 1 and the first electrodes 12 in the PDP 101 (FIG. 6), the first electrodes 12 are exposed in the plan view into the first or third discharge space DS1 or DS3 with a large exposed area although the alignment displacement is small. In contrast, if such alignment displacement occurs in the PDP 101E, the first electrodes 12 are similarly exposed into the first or third discharge space DS1 or DS3. However, the exposed area is small. In short, the PDP 101E is less likely to cause false writing than the PDP 101 when the same displacement occurs, allowing the alignment margin in the second direction h to be increased.

Ribs are generally formed by firing (or burning) a paste material. Thus, tensile forces resulting from thermal contraction may be generated in a firing process, which may cause the ribs to be deformed at the firing. For instance, in the above-described rib 1 (FIG. 6), resultant vectors of tensile forces exerted on connected portions (or intersecting portions) of parts extending in the first and second directions v and h are directed to one direction. The rib 1 is pulled in the direction, and consequently, may be cracked. Further, the above-described ribs 1D (FIG. 12) have corner portions on their peripheries. The corner portions each form an angle of 90°, so that resultant vectors of tensile forces exerted on the corner portions are strongly directed to the inside of the corner portions (i.e., to the inside of the ribs 1D). Therefore, the ribs 1D may be greatly deformed at the firing.

In contrast, the ribs 1E, being formed in diamond-like meshes, allows resultant vectors of tensile forces generated at intersecting portions 1Ek at the firing to be reduced to zero. The ribs 1E can thus be prevented from being cracked due to the above-described tensile forces. Further, the corner portions 1Ec of the ribs 1E each form an angle greater than 90°, so that the resultant vectors of tensile forces exerted on the corner portions 1Ec are relaxed as compared to the ribs 1D (having corner portions of 90°). The ribs 1E can thus be prevented from being deformed due to firing.

<Sixth Preferred Embodiment>

As described above, the ribs 1E of the PDP 101E (FIG. 13), being formed in diamond-like meshes, can be prevented from being cracked and deformed due to firing. However, the subpixels C are of diamond shape longer in the first direction v in accordance with the plane pattern of the ribs 1E, so that resolution in the first direction v in the PDP 101E is lower than that in the PDP 101 (FIG. 4) and the PDP 101D (FIG. 12). Therefore, description will be made in this preferred embodiment on a PDP capable of achieving resolution of the same level as that of the PDPs 101 and 101D while preventing ribs from being cracked and deformed due to firing.

Figure 14:
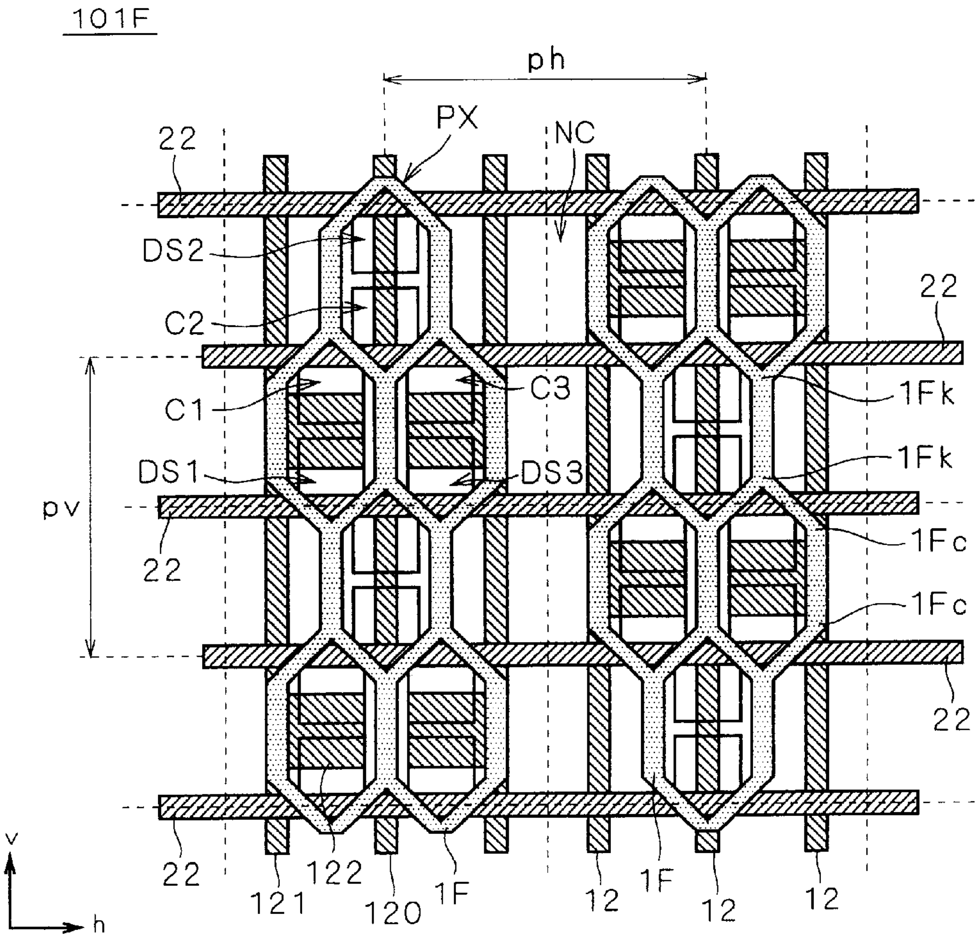
FIG. 14 is a schematic plan view showing a PDP according to a sixth preferred embodiment of the invention.

FIG. 14 is a schematic plan view showing part of components of a PDP (or display device) 101F according to the sixth preferred embodiment.

The PDP 101F includes a plurality of ribs 1F in place of the plurality of ribs 1D in the aforementioned PDP 101D (FIG. 12), while other components are basically similar to those of the PDPs 101 and 101D.

The ribs IF each have a hexagonal mesh structure in the plan view, for dividing the plurality of first to third discharge spaces DS1 to DS3. The ribs 1F are each formed in such a manner that the discharge spaces DS, i.e., subpixels C are of hexagonal shape having the same size in the plan view. The first to third discharge spaces DS1 to DS3 are adjacent to one another with the ribs 1F interposed therebetween in each pixel PX, without (the spaces corresponding to) non-display areas NC interposed between the first to third discharge spaces DS1 to DS3, i.e., the first to third subpixels C1 to C3.

Further, portions of each rib 1F forming a pair of opposed sides of the hexagon extend in the first direction v. Such portions, of two hexagonal meshes, extending in the first direction v for dividing the first and third discharge spaces DS1 and DS3 are opposed to the first electrodes 12 similarly to the ribs 1D. Particularly, the above-described portions of the ribs 1F extending in the first direction v have substantially the same length as the corresponding portions of the ribs 1D.

Those of corner portions 1Fc of hexagonal meshes which are opposed to the first electrodes 12 are corner portions 1Fc of the peripheries of the ribs 1F (i.e., projecting corner portions in the plan view in this case). The corner portions 1Fc of the ribs 1F are each set to form an angle greater than 90° in the plan view.

The ribs 1F, being formed in hexagonal meshes, achieve higher resolution in the first direction v than the ribs 1E formed in diamond-like meshes. Further, the above-described portions of the ribs 1F extending in the first direction v are set to have substantially the same length as the corresponding portions of the ribs 1D, so that the PDP 101F achieves resolution in the first direction v of substantially the same level as that of the PDPs 101 and 101D.

Further, the ribs 1F formed in hexagonal meshes allows resultant vectors of tensile forces generated at intersecting portions 1Fk of the ribs 1F when firing (a paste material for) the ribs to be reduced as compared to that exerted on the intersecting portions or connected portions of the ribs 1D (in the form of T). In other words, although strong tensile forces are exerted in one direction at the intersecting portions of the ribs 1D, such tensile forces can be suppressed by the ribs formed in hexagonal meshes. Therefore, it is possible to prevent the plurality of ribs 1F from being cracked due to the above-described tensile forces.

Further, since the corner portions 1Fc of the ribs 1F each form an angle greater than 90°, so that the resultant vectors of tensile forces exerted on the corner portions 1Fc are relaxed as compared to the ribs 1D (having corner portions of 90°), for example. The ribs 1F can thus be prevented from being deformed due to firing.

As has been described, the PDP 101F is capable of achieving resolution of the same level as that of the PDPs 101 and 101D while preventing ribs 1F from being cracked and deformed due to firing.

<Seventh Preferred Embodiment>

Figure 15:
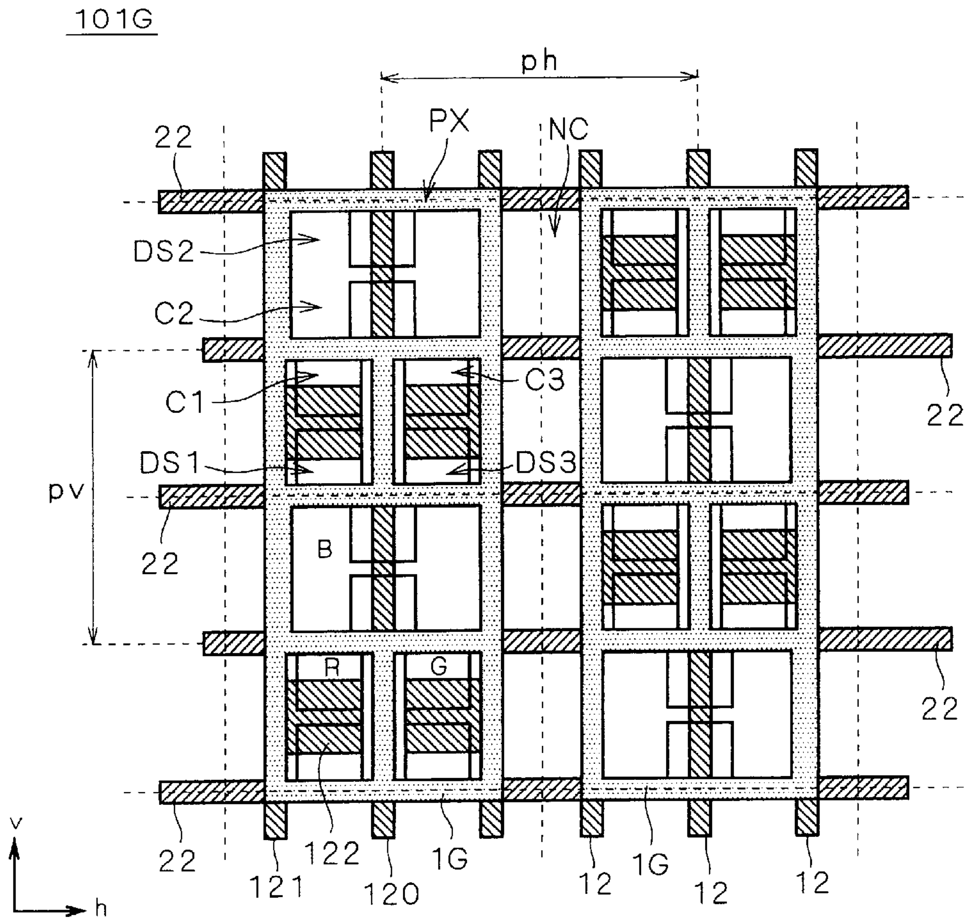
FIG. 15 is a schematic plan view showing a PDP according to a seventh preferred embodiment of the invention.

FIG. 15 is a schematic view showing part of components of a PDP (or display device) 101G according to a seventh preferred embodiment.

The PDP 101G includes a plurality of ribs 1G in place of the plurality of ribs 1D in the aforementioned PDP 101D (FIG. 12), while other components are basically similar to those of the PDPs 101 and 101D.

The plurality of ribs 1G have a structure in which portions of the plurality of ribs 1D defining the second discharge spaces DS2 are extended in the second direction h. Specifically, each rib 1G is formed in such a manner that the second discharge space DS2 becomes larger, more particularly, larger in the second direction h, than the first and third discharge spaces DS1 and DS3 in the plan view. Therefore, the second subpixel C2 is larger than the first and third subpixels C1 and C3 in the PDP 101G.

In each pixel PX of the PDP 101G, the second subpixel C2 in the second direction h is set to have a dimension which is substantially the same as that from an end of the first subpixel C1 in the second direction h (the end on the opposite side of the third subpixel C3) to an end of the third subpixel C3 in the second direction h (the end on the opposite side of the first subpixel C1). Therefore, portions of the ribs 1G extending in the first direction v for forming the second discharge space DS2 and those of the ribs 1G extending in the first direction v for forming the first discharge space DS1 are substantially on a straight line. Similarly, the portions forming the second discharge space DS2 and those of the ribs 1G forming the third discharge space DS3 are substantially on a straight line. Thus, a forming process of the ribs 1G having such configuration is simplified as compared to the ribs 1D (FIG. 12), for example.

Further, in the PDP 101G, the first to third subpixels C1 to C3 are set to emit in red (R), blue (B) and green (G), respectively.

According to the PDP 101G, the phosphor layers 2 (FIG. 5) are provided in the second discharge spaces DS2 by a larger area than in the first and third discharge spaces DS1 and DS3 resulting from a difference in area between the discharge spaces DS1, DS2 and DS3. When the transparent electrodes 222 have the same size, (surface) discharge is caused to the same extent, so that the luminous efficiency is improved as the area to which the phosphor layers 2 are applied becomes larger. In other words, the luminous efficiency of the second subpixel C2 can be improved as compared to that of the first and third subpixels C1 and C3. Consequently, this allows the second subpixel C2 to have higher luminance.

The effect of improvement in luminous efficiency is obtainable when the large second subpixel C2 emits in either luminous color, and becomes remarkable when the second subpixel C2 is set to be the blue subpixel as in the PDP 101G. This is generally attributed to that a phosphor for emitting blue has lower luminance than those for emitting other luminous colors with the same power being applied. Such improvement in luminous efficiency of blue in the PDP 101G allows a color temperature when displaying white to be improved as compared to the PDPs 101 and 101D, for example.

The first to third subpixels C1 to C3 of the PDP 101G, although not being of a uniform size, satisfy the above-described expressions (1) through (7), and further, (8) and (9), similarly to the display device 100. Therefore, the PDP 101G achieves the same effects as those in the display device 100 and the PDP 101.

The form of the ribs 1G may be applied to the aforementioned single rib 1 (FIG. 6), which thereby brings about the same effects. According to the plurality of ribs 1G, the effect of improving exhaust conductance is also obtainable at the same time, <Eighth Preferred Embodiment>

Figure 16:
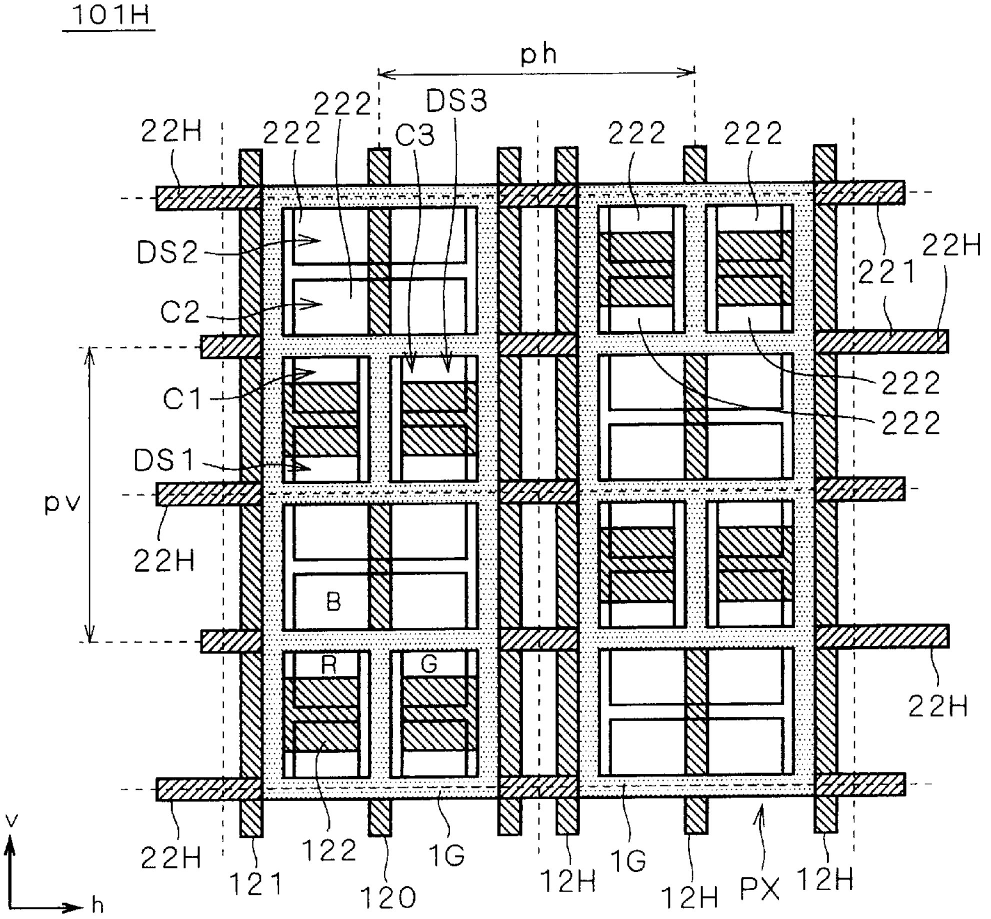
FIG. 16 is a schematic plan view showing a PDP according to an eighth preferred embodiment of the invention.

FIG. 16 is a schematic view showing part of components of a PDP (or display device) 101H according to an eighth preferred embodiment.

The PDP 101H includes a plurality of first and second electrodes 12H and 22H in place of the plurality of first and second electrodes 12 and 22 in the aforementioned PDP 101G (FIG. 15), while other components are basically similar to those of the PDP 101D.

The second electrodes 22H of the PDP 101H each have a structure in which the transparent electrodes 222 of the aforementioned second electrodes 22 opposed to the second discharge spaces DS2 are made longer than the transparent electrodes 222 opposed to the first and third discharge spaces DS1 and DS3. In other words, portions of each second electrode 22H in the PDP 101H forming the second discharge gap DG2 are larger than those forming the first and third discharge gaps DG1 and DG3.

Therefore, larger power can be applied to the second discharge space DS2 than the first and third discharge spaces DS1 and DS3 with the same voltage being applied, so that luminance of the second subpixel C2 can be improved as compared to, for example, the PDPs 101 and 101D, and further, the PDP 101G. Since the phosphor layers 2 for emitting blue are provided in the second discharge spaces DS2 in the PDP 101H similarly in the PDP 101G, a color temperature when displaying white can be improved as compared to those in, for example, the PDPs 101 and 101D, and further, the PDP 101G.

Although the first electrodes 12H of the PDP 101H each include the stripe electrodes 120, the trunk electrodes 121 and the branch electrodes 122 similarly to the aforementioned first electrodes 12, the trunk electrodes 121 of the first electrodes 12H are provided in the non-display areas NC in the plan view. With such change in arrangement position of the trunk electrodes 121, the branch electrodes 122 of the first electrodes 12H extend longer in the second direction h than those of the first electrodes 12 and are connected to the trunk electrodes 121. The stripe electrodes 120 of the first electrodes 12H are provided similarly to those of the first electrodes 12.

Since the first electrodes 12H are provided as described above, it is possible to locate the first electrodes 12H (specifically, the trunk electrodes 121) away from the large transparent electrodes 222 opposed to the second discharge spaces DS2 as compared to the structure to which the first electrodes 12 are applied. It is therefore possible to reduce an electric field intensity between the large transparent electrodes 222 and the first electrodes 12H, thereby suppressing false discharge.

Further, the branch electrodes 122 of the first electrodes 12H are more difficult to be opposed to the second discharge spaces DS2 as compared to the case of using the first electrodes 12 even if alignment displacement occurs to some extent between the first electrodes 12H and the ribs 1G in the second direction h. In short, the first electrodes 12H achieve an increased alignment margin in the second direction h.

<Ninth Preferred Embodiment>

Figure 17:
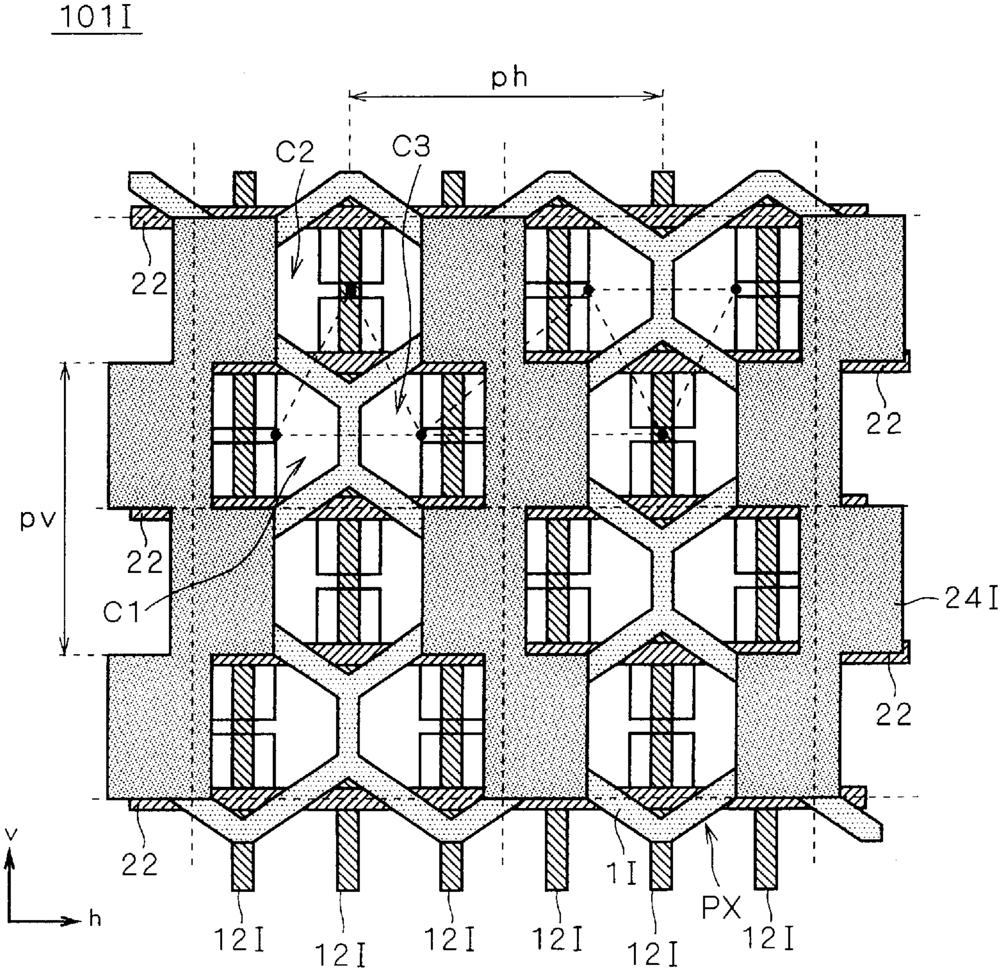
FIGS. 17 and 18 are schematic plan views showing a PDP according to a ninth preferred embodiment of the invention.
Figure 18:
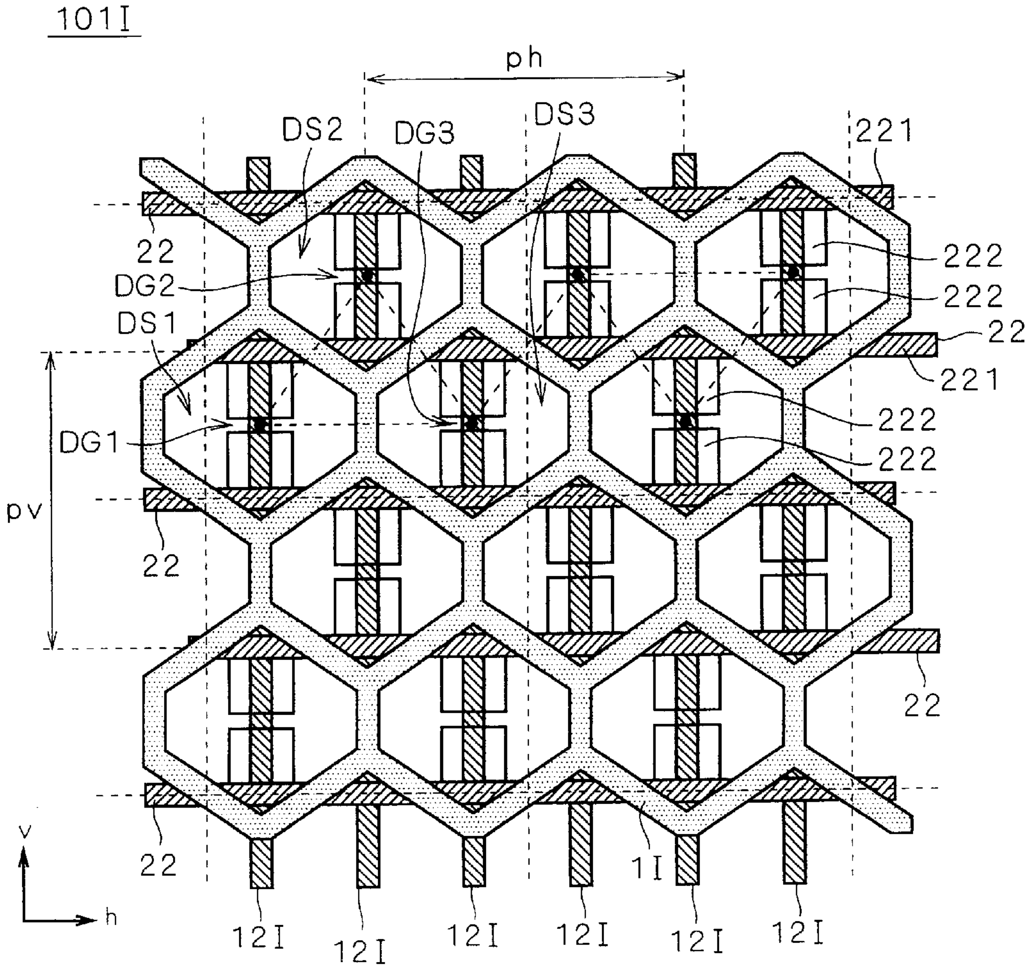
Figure 19:
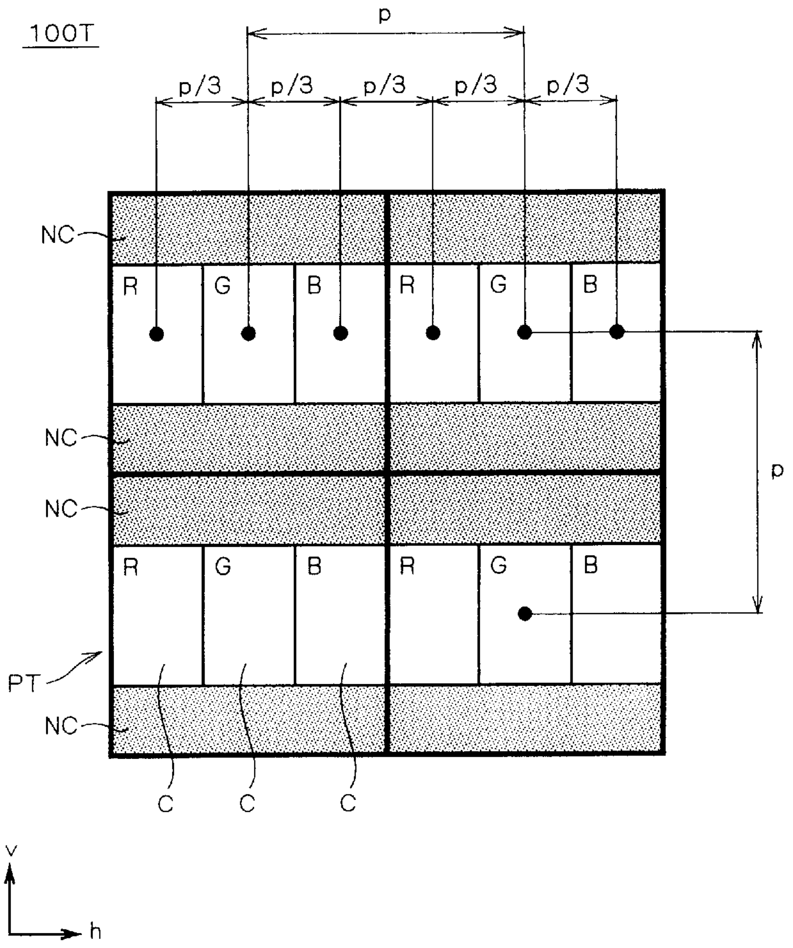
F I G . 1 9 (PRIOR ART)
FIG. 19 is a schematic plan view showing a conventional trio-arrangement pixel.

FIG. 17 is a schematic view showing a PDP (or display device) 101I according to a ninth preferred embodiment, and FIG. 18 is a schematic plan view showing part of the components extracted from FIG. 17.

The PDP 101I includes sa rib 1I, a plurality of first electrodes 12I and black layers 24I in place of the rib 1, the plurality of first electrodes 12 and the black layers 24, respectively, in the aforementioned PDP 101 (FIG. 4), while other components are basically similar to those of the PDP 101.

Unlike the aforementioned PDP 101 or the like, the discharge spaces DS in the PDP 101I do not correspond to subpixels C. The subpixels C in the PDP 101I are formed by combination of the discharges spaces DS and the black layers 24I.

Specifically, the rib 1I of the PDP 101I divides the space between the first and second substrates 11 and 21 into the plurality of the first to third discharge spaces DS1 to DS3 arranged in the form of a delta in the plan view.

In the PDP 101I, the first to third discharge spaces DS1 to DS3 are hexagonal of the same size in the plan view. The first to third discharge spaces DS1 to DS3 are adjacent to one another with the rib 1I interposed therebetween without (a space corresponding to) non-display areas NC interposed therebetween. In short, the rib 1I divides the space between the first and second substrates 11 and 21 into hexagonal meshes. Further, one pair of opposed sides of each hexagon of the rib 1I extends in the first direction v.

As shown in FIG. 18, the component of the arrangement interval between the first to third discharge spaces DS1, DS2 and DS3 in the second direction h is set in ph/3 (=p/3), while components of the arrangement intervals between the second discharge space DS2 and the first and third discharge spaces DS1 and DS3 in the first direction v are set in pv/2 (=p/2).

The plurality of first electrodes 12I of the PDP 101I are basically similar to the plurality of first electrodes 12C (FIG. 11). In other words, the first electrodes 12I are each in the form of stripe extending in the first direction v opposed to any one of the discharge spaces DS1 to DS3 aligned in the first direction v. In this case, the first electrodes 12I opposed to the second discharge spaces DS2 aligned in the first direction v are opposed to (i.e., in the plan view, is hidden by) the portions of the rib 1I dividing the first and third discharge spaces DS1 and DS3. Similarly, the first electrodes 12I opposed to the first discharge spaces DS1 aligned in the first direction v are opposed to the portions of the rib 1I dividing the second discharge spaces DS2 and the third discharge spaces DS3 adjacent in the second direction h, while the first electrodes 12I opposed to the third discharge spaces DS3 aligned in the first direction v are opposed to the portions of the rib 1I dividing the second discharge spaces DS2 and the first discharge spaces DS1 adjacent in the second direction h. The first electrodes 12I are aligned in the second direction h with the same component of the arrangement interval between the discharge spaces DS in the second direction h.

The transparent electrodes 222 of the second electrodes 22 of the PDP 101I are provided in such a manner that the first to third discharge gaps DG1 to DG3 are opposed to the first to third discharge spaces DS1 to DS3 similarly to the PDP 101, whereas a component of the arrangement interval of the transparent electrodes 222 in the second direction h is different from that in the PDP 101 due to the difference in arrangement of the first to third discharge spaces DS1 to DS3.

The black layers 24I of the PDP 101I are provided on the second substrate 21 similarly to the black layers 24. Particularly, as shown in FIG. 17, the black layers 24I are so provided as to cover part of the first to third discharge spaces DS1 to DS3 in the plan view (i.e., so as to reduce the size of the discharge spaces DS1 to DS3). That is, the black layers 24I limit the position, shape and size of an opening through which visible light generated in the discharge spaces DS is led out. In other words, the black layers 24I convert part of the plane pattern of the discharge spaces DS into non-display areas NC whose display/non-display cannot be controlled. Thereby formed are the subpixels C1 to C3 which are unit regions whose display/non-display of predetermined luminous colors can be controlled in the plan view of the display.

Specifically, the black layers 24I are so provided as to cover both edge portions of the second discharge space DS2 in the second direction h in each pixel PX in the plan view, thereby forming the second subpixel C2. Further, the black layers 24I are so provided as to cover an edge portion of the first discharge space DS1 far from the third discharge space DS3 in the second direction h in each pixel PX in the plan view, thereby forming the first subpixel C1. Furthermore, the black layers 24I are so provided as to cover an edge portion of the third discharge space DS3 far from the first discharge space DS1 in the second direction h in each pixel PX in the plan view, thereby forming the third subpixel C3.

The PDP 101I, being provided with the black layers 24I such that the subpixels C1 to C3 satisfy the expressions (1) to (7), and further, (8) and (9), achieves the same effects as those in the display device 100 and the PDP 101. Conversely, when the PDP 101I is not provided with the black layers 24I (FIG. 18), color split easily occurs similarly to the conventional delta-arrangement pixels PD (FIG. 20). Further, the black layers 24I achieve an improved contrast ratio in a bright room. It is possible to suppress graininess in the PDP 101I as well by forming the black layers 24I in stripes extending in the first direction v as a whole, as shown in FIG. 17.

Further, according to the arrangement of the black layers 24I, the first to third subpixels C1 to C3 can easily be formed from the first to third discharge spaces DS1 to DS3.

The black layers 24I may be provided in such a manner that the second subpixel C2 becomes larger similarly to the PDP 101G (FIG. 15).

According to the configuration of the PDP 101I from which the black layers 24I are removed (FIG. 18), the subpixels C1 to C3 are larger because of the absence of the non-display areas NC, so that a PDP of high luminance can be obtained. In such PDP, a side face of the rib 1I is smaller than its bottom face in area, which allows visible light to be easily led out, resulting in high luminous efficiency.

In view of this point, visible light generated in the discharge spaces DS is shielded by the black layers 24I, so that the PDP 101I might have lower luminance and luminous efficiency than the PDP not provided with the black layers 24I. However, the black layers 24I, provided at edge portions of the discharge spaces DS emitting relatively feeble light, do not remarkably reduce luminance and luminous efficiency. Further, it is possible to suppress reduction in luminance and luminous efficiency by applying a material of high reflectance such as titanium oxide or aluminum oxide onto the black layers 24I (on the first substrate 11 side) so as be opposed to the discharge spaces DS. In short, visible light generated in the discharge spaces DS, after being reflected by the material of high reflectance and further by the rib 1I and the like, can be led out as display light.

<Variant>

The black layers 24 and 24I may be of colors other than black and may include a layer of such dark colors that desired light shielding and low reflectivity are obtainable.

Although the PDPs have been described as specific examples of the display device 100 (FIG. 1) in the above description, the display device 100 may also be embodied by liquid crystal displays (LCDs), field emission displays (FEDs) and the like.

While the invention has been shown and described in detail, the foregoing description is in all aspects illustrative and not restrictive. It is therefore understood that numerous modifications and variations can be devised without departing from the scope of the invention.

What is claimed is:

1. A display device comprising a plurality of pixels aligned in a first direction and a second direction perpendicular to said first direction and arranged as a whole in a matrix form in a plan view, said plurality of pixels each including first to third subpixels arranged in the form of a delta in the plan view, wherein expressions: pv1=pv2=pv/2; pv3=0; and ph1=ph2<ph/3 hold where:

components of an arrangement interval between said plurality of pixels in said first and second directions are indicated by pv and ph, respectively;

with respect to each of said plurality of pixels, components of said arrangement interval between said first and second subpixels in said first and second directions are indicated by pv1 and ph1, respectively;

components of said arrangement interval between said second and third subpixels in said first and second directions are indicated by pv2 and ph2, respectively; and a component of said arrangement interval between said first and third subpixels in said first direction is indicated by pv3, expressions: pv4=pv/2; pv5=0; and ph4>ph/3 hold where:

with respect to first and second subpixels among said plurality of pixels adjacent to each other in said second direction, components of said arrangement interval between said third subpixel of said first pixel and said first subpixel of said second pixel in said first and second directions are indicated by pv4 and ph4, respectively; and a component of said arrangement interval between said second subpixel of said first pixel and said first subpixel of said second pixel in said first direction is indicated by pv5, and adjacent ones of said plurality of pixels in said first direction have the same arrangement of said first to third subpixels.

2. The display device according to claim 1, further comprising a black layer provided in a non-display area whose display/non-display cannot be controlled in the plan view.

3. The display device according to claim 1 comprising:

first and second substrates opposed to each other at a predetermined spacing;

a rib dividing a space between said first and second substrates into a plurality of first to third discharge spaces corresponding to said first to third subpixels, respectively;

a plurality of first electrodes provided on said first substrate so as to be opposed to said plurality of first to third discharge spaces;

a plurality of second electrodes provided on said second substrate so as to form a plurality of discharge gaps opposed to said plurality of first to third discharge spaces; and a dielectric layer covering said plurality of second electrodes.

4. The display device according to claim 3, wherein said plurality of first electrodes include a plurality of electrodes opposed to said plurality of second discharge spaces and opposed to portions of said rib dividing said plurality of first and third discharge spaces.

5. The display device according to claim 3, wherein said plurality of first electrodes include:

a plurality of branch electrodes opposed to said plurality of first and third discharge spaces; and a plurality of trunk electrodes connecting those of said branch electrodes aligned in said first direction.

6. The display device according to claim 5, wherein at least one of said plurality of branch electrodes includes an electrode having one of O-, T- and U-shaped patterns.

7. The display device according to claim 3, wherein said plurality of first electrodes include:

a plurality of first stripe electrodes opposed to said plurality of second discharge spaces and opposed to portions of said rib dividing said plurality of first and third discharge spaces; and a plurality of second stripe electrodes opposed to said plurality of first and third discharge spaces and opposed to portions of said rib defining said plurality of second discharge spaces.

8. The display device according to claim 3, wherein said rib includes a plurality of ribs dividing said plurality of first to third discharge spaces and not being connected with one another in said second direction.

9. The display device according to claim 8, wherein said plurality of ribs, in the plan view, are provided in the form of diamond-like meshes for dividing said plurality first to third discharge spaces, and are opposed to said plurality of first electrodes at tops of said diamond-like meshes and have corner portions each forming an angle greater than 90°.

10. The display device according to claim 8, wherein said plurality of ribs, in the plan view, are provided in the form of hexagonal meshes for dividing said plurality first to third discharge spaces, and have corner portions each forming an angle greater than 90°.

11. The display device according to claim 3, wherein said second subpixel is larger than said first and third subpixels in each of said plurality of pixels, said display device further comprising a plurality of phosphor layers provided in said plurality of first to third discharge spaces.

12. The display device according to claim 11, wherein in each of said plurality of pixels, said second subpixel has a dimension in said second direction substantially the same as that from an end of said first subpixel in said second direction to an end of said third subpixel in said second direction.

13. The display device according to claim 11, wherein in said plurality of second electrodes, portions forming said plurality of second discharge gaps are larger than those forming said plurality of first and third discharge gaps.

14. The display device according to claim 1 comprising:

first and second substrates opposed to each other at a predetermined spacing;

a rib dividing a space between said first and second substrates into a plurality of first to third discharge spaces arranged in the form of a delta in the plan view;

a plurality of first electrodes provided on said first substrate so as to be opposed to said plurality of first to third discharge spaces;

a plurality of second electrodes provided on said second substrate so as to form a plurality of first to third discharge gaps opposed to said plurality of first to third discharge spaces;

a dielectric layer covering said plurality of second electrodes; and a plurality of black layers provided on said second substrate in the plan view to:

cover both end portions in said second direction of each of said plurality of second discharge spaces, thereby forming said second subpixel; cover an end of each of said plurality of first discharge spaces far from an adjacent one of said plurality of third discharge spaces, thereby forming said first subpixel; and cover an end of each of said plurality of third discharge spaces far from an adjacent one of said plurality of second discharge spaces, thereby forming said third subpixel.

* * * * *